United States Patent
Karsanbhai et al.

(10) Patent No.: US 8,355,570 B2
(45) Date of Patent: Jan. 15, 2013

(54) SYSTEMS AND METHODS FOR RASTER-TO-BLOCK CONVERTER

(75) Inventors: Manhar Karsanbhai, Superior, CO (US); John M Brooks, Longmont, CO (US)

(73) Assignee: Conexant Systems, Inc., Newport Beach, CA (US)

( * ) Notice: Subject to any disclaimer, the term of this patent is extended or adjusted under 35 U.S.C. 154(b) by 704 days.

(21) Appl. No.: 12/540,330

(22) Filed: Aug. 12, 2009

(65) Prior Publication Data

US 2011/0038539 A1 Feb. 17, 2011

(51) Int. Cl.
*G06K 9/00* (2006.01)
(52) U.S. Cl. ............................ 382/165; 358/426.05
(58) Field of Classification Search .............. None
See application file for complete search history.

(56) References Cited

U.S. PATENT DOCUMENTS

| | | | |
|---|---|---|---|
| 5,446,560 A | | 8/1995 | Schwartz |
| 5,623,311 A | * | 4/1997 | Phillips et al. ............ 375/240.25 |
| 5,745,173 A | * | 4/1998 | Edwards et al. ............ 348/208.4 |
| 5,781,238 A | * | 7/1998 | Kondo et al. ............ 375/240.03 |
| 5,841,375 A | * | 11/1998 | Kondo et al. .................... 341/50 |
| 5,920,352 A | * | 7/1999 | Inoue .......................... 348/384.1 |
| 6,266,446 B1 | * | 7/2001 | Rengakuji ...................... 382/232 |
| 6,298,166 B1 | * | 10/2001 | Ratnakar et al. .............. 382/248 |
| 6,424,385 B1 | * | 7/2002 | Koyama et al. ............... 348/734 |
| 6,650,261 B2 | * | 11/2003 | Nelson et al. ................. 341/106 |
| 7,352,494 B2 | * | 4/2008 | Tsumura et al. .......... 358/426.05 |
| 7,529,412 B2 | * | 5/2009 | Park .............................. 382/232 |
| 7,580,565 B2 | * | 8/2009 | Park et al. ..................... 382/166 |

* cited by examiner

*Primary Examiner* — Samir Ahmed
(74) *Attorney, Agent, or Firm* — Jackson Walker L.L.P.; Christopher J. Rourk

(57) ABSTRACT

A raster to block converter and equivalently a block to raster converter can be implemented using enough memory to contain a single image band, that is a band of pixels of height equal to a single block but spanning the entire width of an image. The raster to block converter can operate at full rate so that as soon as a pixel is read out from the memory a new pixel can be stored in its place. The location of a pixel can be tracked using a mapping involving basic modular arithmetic. This raster to block converter is scalable so that it can work with any size image and block size.

20 Claims, 22 Drawing Sheets

|    |    |    |    |    |
|----|----|----|----|----|
| 0  | 1  | 2  | 3  | 4  |
| 5  | 6  | 7  | 8  | 9  |
| 10 | 11 | 12 | 13 | 14 |
| 15 | 16 | 17 | 18 | 19 |

FIG. 9A

|   |   |    |    |    |
|---|---|----|----|----|
| 0 | 4 | 8  | 12 | 16 |
| 1 | 5 | 9  | 13 | 17 |
| 2 | 6 | 10 | 14 | 18 |
| 3 | 7 | 11 | 15 | 19 |

FIG. 9B

|    |    |    |    |    |
|----|----|----|----|----|
| 0  | 16 | 13 | 10 | 7  |
| 4  | 1  | 17 | 14 | 11 |
| 8  | 5  | 2  | 18 | 15 |
| 12 | 9  | 6  | 3  | 19 |

FIG. 9C

SYSTEMS AND METHODS FOR RASTER-TO-BLOCK CONVERTER

BACKGROUND OF THE INVENTION

1. Field of the Invention

The present invention relates to the processing of digital images and more specifically to the conversion between images transported in raster order to images transported in block order.

2. Related Art

In modern electronics, a digital image comprises a set of pixels. Each pixel has associated with it a pixel value and pixels are usually laid out in a two-dimensional grid covering the image. The pixel value can be a single numeric value or a set of numeric values. For example, in a monochromatic image, a pixel value is typically a single number representing the intensity or luminance. For polychromatic or color images, the pixel value can be one of several schemes based on the type of color space used. It can be represented by a number for luminance (Y) and two numbers for chrominance ($C_r$, $C_b$). It can also be red-green-blue (RGB) or cyan-yellow-magenta-black (CYMK) color spaces. The space of one of these colors is often referred to as color planes, e.g., RGB color spaces are often referred to as comprising a red color plane, a green color plane and a blue color plane.

Conventionally, image sources generate image data with pixels either in raster order. FIG. 1 shows the raster ordering of pixels. By convention it begins with the upper left pixel of an image followed by pixels scanning from left to right, followed by a scanning from left to right on the subsequent line until the rightmost pixel on the bottom line of the image is reached. Less conventionally, the scanning can proceed first from right to left then top to bottom or top to bottom and then left to right, etc. For the sake of simplicity, the left to right top scanning is considered, although one of ordinary skill in the art will recognize the equivalence of the different orientations.

In video applications, the raster stream of pixels from one image is immediately followed by a stream of pixels representing a subsequent image in a sequence of images. More specifics as to particulars as to the pixel representation and stream format can be found in various standards, such as motion pictures experts group (MPEG) or motion joint photographic experts group (MJPEG).

Like image sources, typical display devices operate with raster ordering of pixels. However, because of the large amount of data present in raw image data, high degrees of image compression is often sought for the storage or transport of digital images as well as video applications. Because images are naturally two-dimensional in nature, the best image compression techniques operation on two dimensional blocks For example the joint photographic experts group (JPEG) compression algorithm first divides an image into a square block of 8×8 pixels then compresses each block.

Ideally, for the input to an image compressor/encoder the image data should be presented in block order and the output to an image decompressor/decoder should be received in block order. FIG. 2 shows the simplest block ordering. Here in this example the blocks are 4×4 and additional spacing between some pixels are shown for clarity. Within each block the format is not important but raster ordering within a block is often seen as most convenient.

A difficulty arises because image sources and image displays tend to operate in raster order and image compression systems operate in block order. Because of this, an image compressor/encoder must store multiple raster lines of pixels until all the pixels of a block are received. Similarly, an image decompressor/decoder which would present image data in block order, enough data blocks must be stored until store blocks until a complete raster line is received. Because the storage need only be large as one row of blocks, referred to as an image band, memory requirements can be as little as a n×w pixels where n is the height of a block and w is the width of an image.

FIGS. 3A-E shows an exemplary buffer for storing an image band for raster to block conversion in its various states of operation. The buffer comprises n×w pixels and is shown in array form for clarity, but in principle is most likely a contiguous linear memory. In this example a block size of 4×4 is used with an image width of 20 pixels. FIG. 3A shows the buffer after one raster line has been received. FIG. 3B shows the buffer after a second raster line has been received. FIG. 3C shows the buffer after the entire image band is written. FIG. 3D shows the buffer after the first block is read and the memory corresponding to the block is vacated. FIG. 3E shows the buffer after a second block is read and the corresponding memory is vacated.

Clearly an image band buffer can be used to convert from raster order to block order. However, the difficulty arises when as the first image band is read from the buffer, a second image band is written in. FIG. 4A shows the image band buffer with the first block vacated. As the first raster line of the second image band is received, the first four pixels can be stored in the vacated memory. However, as shown in FIG. 4B the memory for the next four pixels is still occupied by the second block. These memory locations are shown in solid black.

One of the simplest and effective solutions is to use two image buffers. FIGS. 5A-F shows the operation of a dual image band buffer system using the same exemplary dimensions as in FIGS. 4A-D and FIGS. 5A-B. In FIG. 5A, the first raster line from the first image band is stored into image buffer 502. In FIG. 5B, the entire first image band is stored into image buffer 502. In FIG. 5C, the first block is read from image buffer 502 at the same time the first 16 pixels from the first raster line from a second image band are received and stored into image buffer 504. In FIG. 5D, the second block is read from image buffer 502 and at the same time the next 16 pixels from the first and second raster lines from the second image band are received and stored into image buffer 504. In FIG. 5E, all the blocks from the first image band have been read from image buffer 502 and the entire image band is stored in image buffer 504. At this point image buffer 502 is ready to receive a third image band and image buffer 504 has blocks ready to be read. In FIG. 5F the first image block of the second image band is read from image buffer 504 and the first 16 pixels from the first raster line from a third image band is received stored in image buffer 502. This process continues back and forth between the two image buffers in a technique known as ping-ponging.

FIG. 6 shows a typical implementation of a ping-ponging raster to block converter. Converter 600 described here is similar to that described in the background section of U.S. Pat. No. 5,446,560. The converter comprises image band buffer 602 and image band buffer 604, multiplexer 606, address generators 608 and 610 and inverter 612.

A stream of pixels in raster order is supplied to both image band buffer 602 and image band buffer 604. A state input is supplied to the write enabled input of image band buffer 602 and to inverter 612. The output of the inverter is supplied to the write enable input of image band buffer 604. This ensures that the input data received is written by only one of the image band buffers. The outputs of the image band buffers are fed to multiplexer 606 which selects the signal based on the same state input.

The address of image band buffer 602 is provided by address generator 608 and the address of image band buffer 604 is provided by address generator 610. Address generator 608 generates an address which dictates the location in image band buffer 602 which is read from and written to; address generator 610 generates the address of locations in image band buffer 604 which is read from and written to.

When the state input is set to 0 image band buffer 604 is written to and the multiplexer selects image band buffer 602 to be read from, causing image band buffer 604 to fill and image band buffer 602 to empty. Once image band buffer 604 is full, the state input changes to state 1. When the state is set to 1 the roles are reversed. Image band buffer 602 is written to and the multiplexer selects image band buffer 604 to be read from, causing image band buffer 604 to fill and image band buffer 602 to empty.

To convert from raster to block ordering, address generator 610 might generate an address sequence in raster order in state 0, and then in state 1, generate an address sequence which would read the pixels out of image band buffer 604 in block order. Address generator 608 operates similarly, but generates the raster order addresses in state 1, and the block ordered address sequence in state 0. Image band buffer, and a continuous stream of pixels can be output from the image band buffers into which data is not being written.

While this architecture converts from raster order to pixel order effectively, it does at the expense of twice the memory cost. For images, even an image band can occupy significant memory, for example, for three color pixels at one byte each and an image width of 1024 pixels and an 8×8 block size, 24 kilobytes of RAM are needed for buffering. While in today's age of copious memory, this may not seem like a lot, video memory is usually very high performance and expensive, especially when incorporated into an integrated circuit. Therefore reduction of memory requirements for raster to block order is needed.

The aforementioned U.S. Pat. No. 5,446,560, does provide a system for conversion between raster and block ordering that requires only one image band buffer, but it is complicated and not easily scalable. This design trades off savings from reduced memory for the complexity of the additional circuitry required to implement this solution. Therefore there is a need in the industry for a conversion system between block and raster ordering that does not require large amounts of memory and that is simple to implement and scalable.

SUMMARY OF INVENTION

A reordering converter for converting raster to block ordering or block to raster ordering. The converter comprises a memory with sufficient capacity to hold at least one image band. Such a memory is referred to as an image band buffer. It also comprises a memory controller or control logic which controls the reading and transmitting of pixel data from the image band buffer and the receiving and storing of pixel data to the image band buffer. It comprises an address converter to insure that when outgoing pixels are read from memory in the correct order. The address conversion maps the image sliver portion of a pixel location to the image sliver portion of a memory location using modular arithmetic. Depending on a multiplicative factor used in the modular arithmetic, the reordering converter can convert from raster order to block ordering or vice versa. Furthermore, the reordering converter can be included in an image encoder or decoder as well as motion image or video encoder or decoder.

This reordering converter can be included in any sort of image processing apparatus including image encoders and decoders, motion image encoders and decoders or dedicated raster to block converters or block to raster converter.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 8 is an example of what an image band buffer in memory would look like;

FIG. 9A shows an image band buffer for and image that is 5 blocks wide with 4×4 blocks;

FIG. 9B shows the ordinal arrangement of image slivers after one reading of the image band buffer;

FIG. 9B shows the ordinal arrangement of image slivers after two reading of the image band buffer;

FIG. 16 illustrates the block to raster converter incorporated into a DCT decoder such as a JPEG decoder;

FIG. 29 shows a corresponding motion image decoder.

DETAILED DESCRIPTION

A detailed description of embodiments of the present invention is presented below. While the disclosure will be described in connection with these drawings, there is no intent to limit it to the embodiment or embodiments disclosed herein. On the contrary, the intent is to cover all alternatives, modifications and equivalents included within the spirit and scope of the disclosure.

Rather than ping-ponging between two image band buffers, an incoming pixel can be stored in a memory location vacated by an outgoing pixel. By doing this, the order in which the addresses should be read ultimately will be scrambled. However, each row of any given block will remain continuous. Therefore, it is convenient to refer to a row of a block as a sliver. Therefore, an m×n block will comprise n m×1 slivers. For the foregoing discussion, it is convenient to describe a general image raster to block converter in terms of the following parameters. A block is denoted as having m×n pixels. The image is denoted as having width of W blocks. Of course W is equal to the image width divided by the block width.

Figure 1:
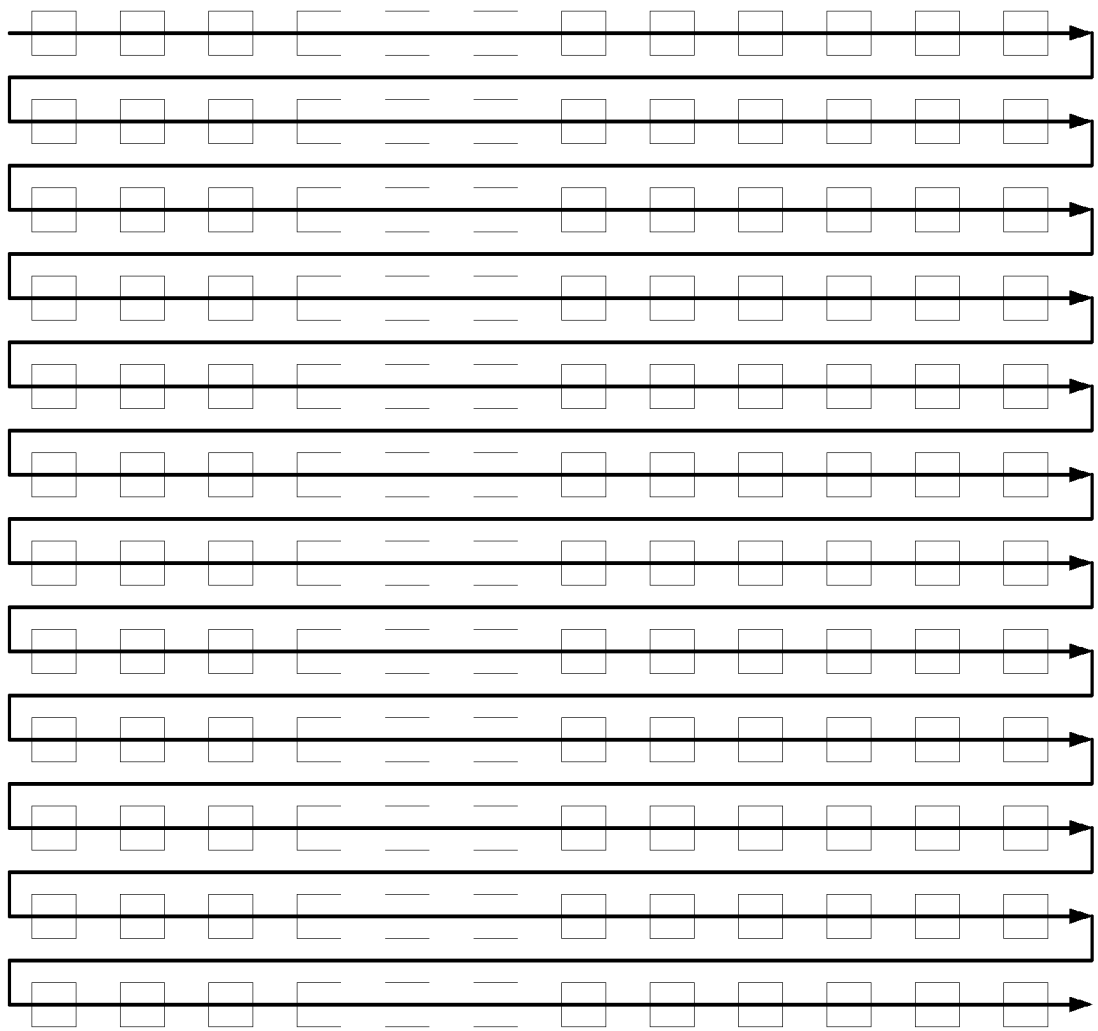
FIG. 1 shows the raster ordering of pixels.
Figure 2:
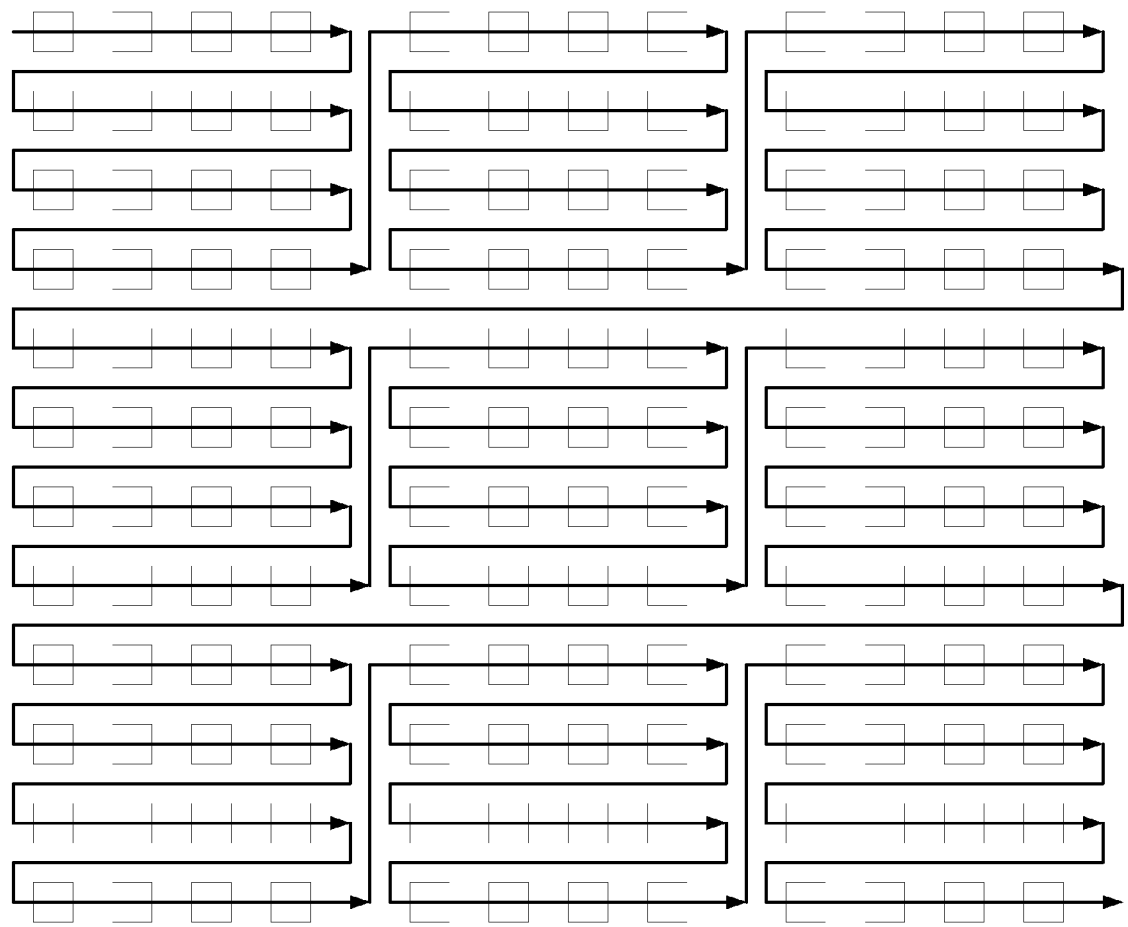
FIG. 2 shows the simplest block ordering.
Figure 3A:
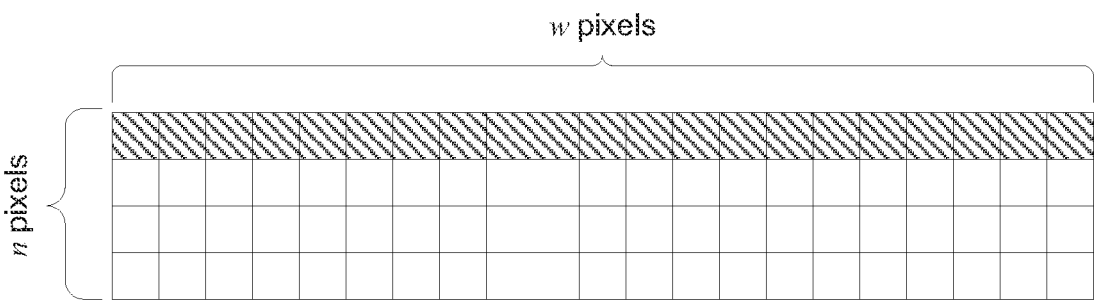
FIG. 3A shows an exemplary after one raster line has been received.
Figure 3B:
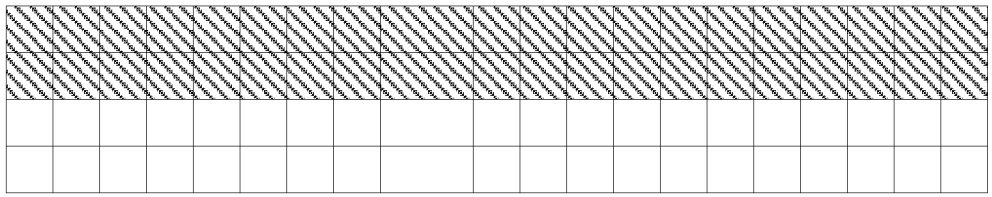
FIG. 3B shows the buffer after a second raster line has been received.
Figure 3C:
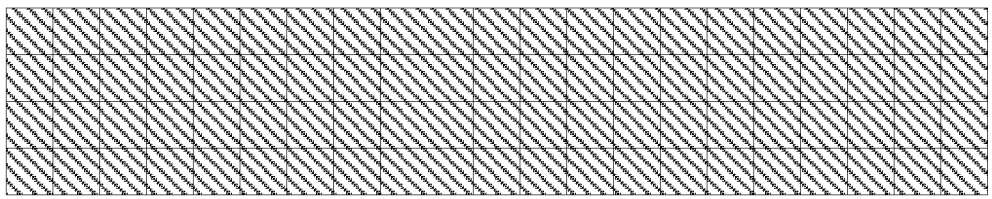
FIG. 3C shows the buffer after the entire image band is written.
Figure 3D:
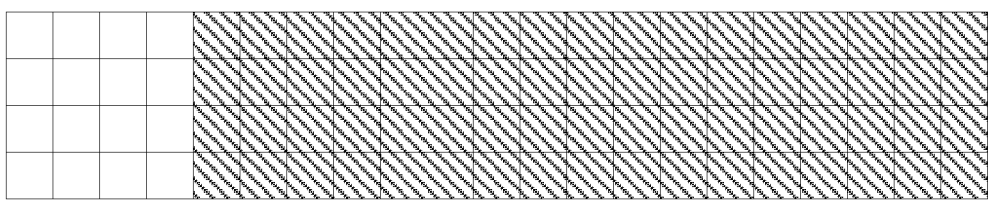
FIG. 3D shows the buffer after the first block is read and the memory corresponding to the block is vacated.
Figure 3E:
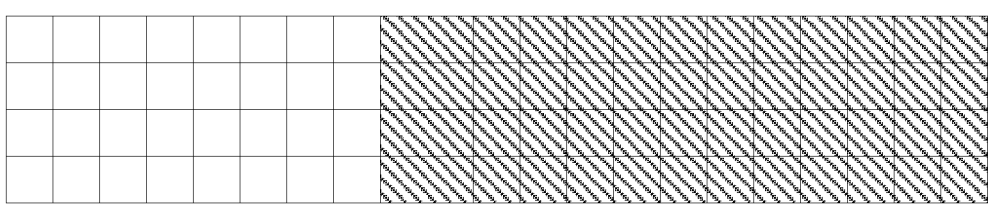
FIG. 3E shows the buffer after a second block is read and the corresponding memory is vacated.
Figure 4A:
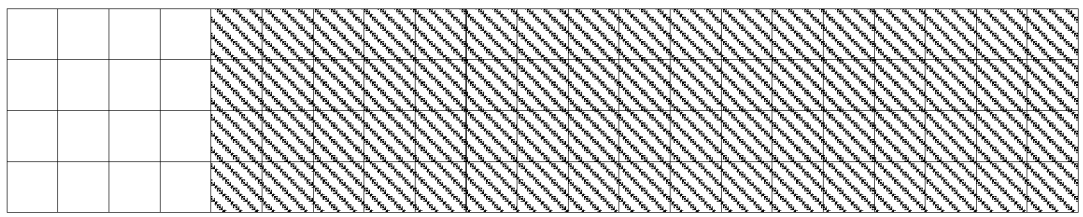
FIG. 4A shows the image band buffer with the first block vacated.
Figure 4B:
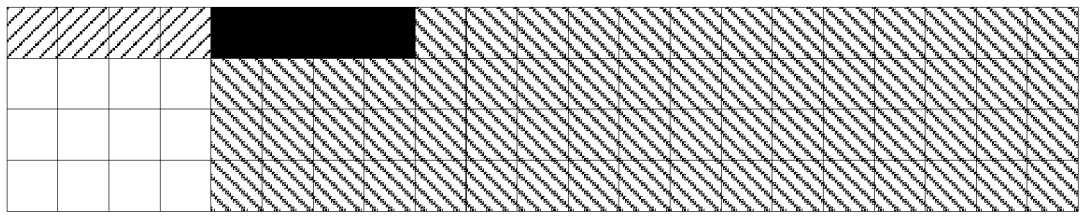
FIG. 4B shows that the memory for the next four pixels is still occupied by the second block.
Figure 5A:
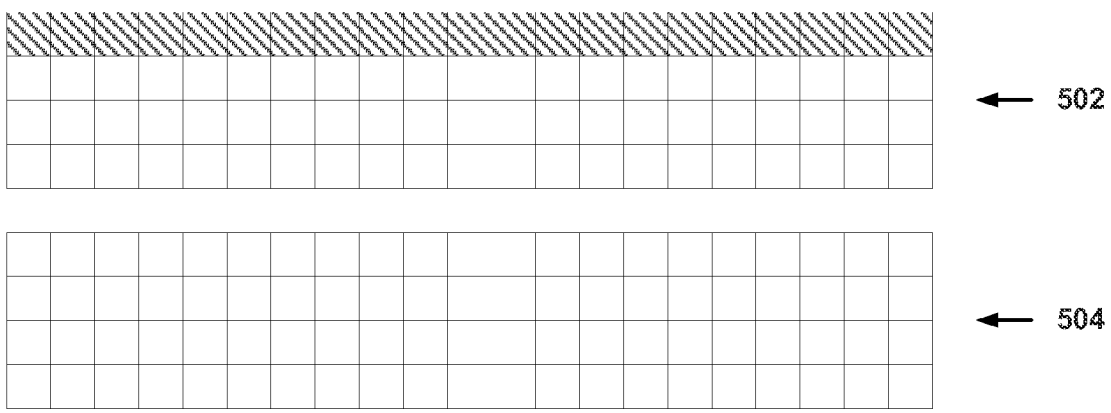
FIGS. 5A-F shows the operation of a dual image band buffer system.
Figure 5B:
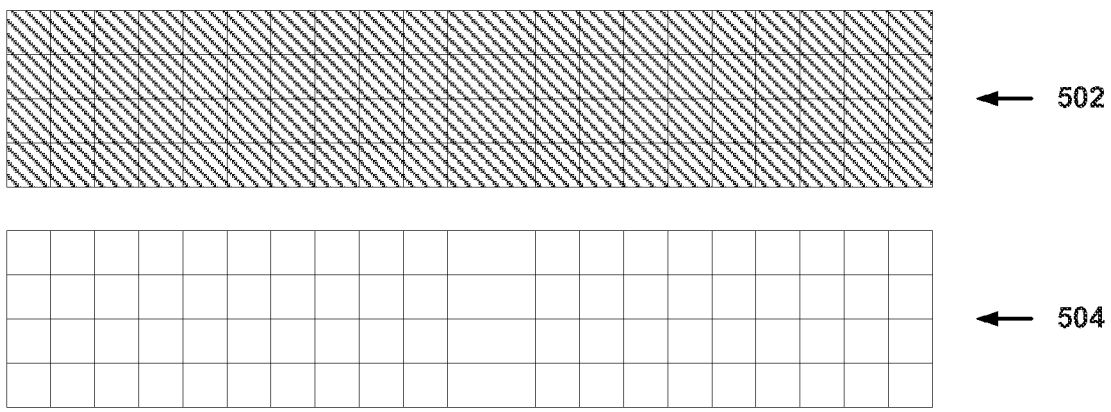
Figure 5C:
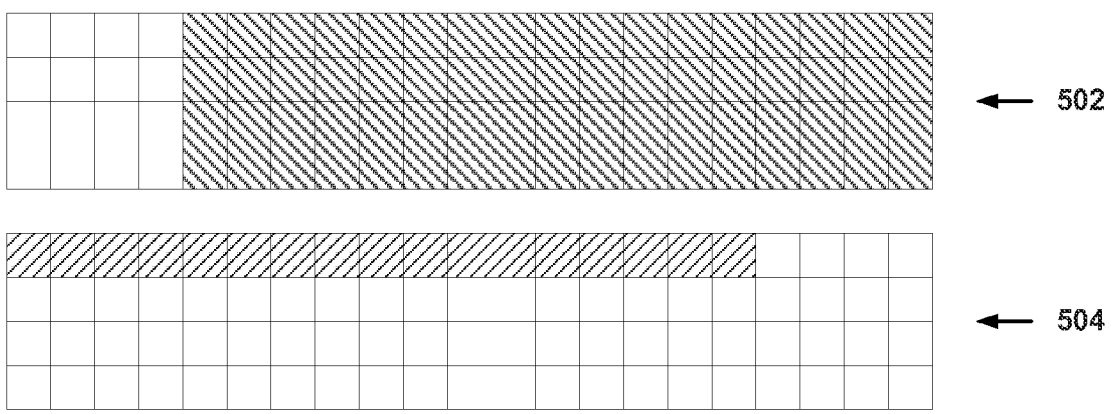
Figure 5D:
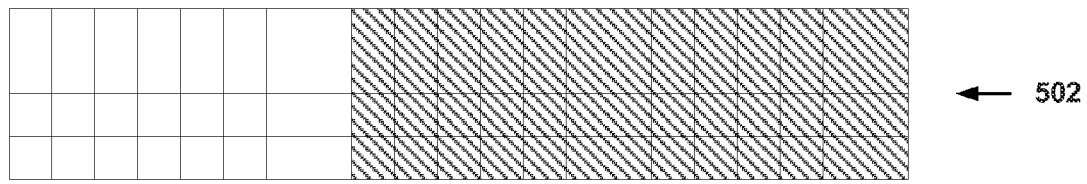
Figure 5D:
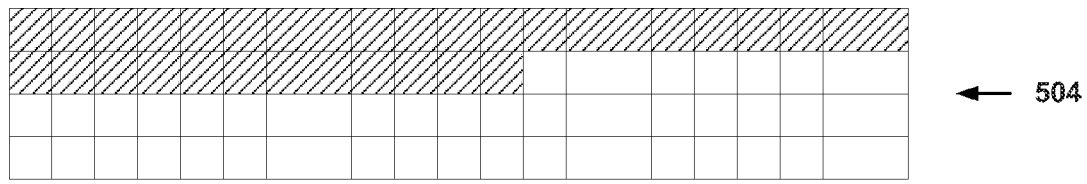
Figure 5E:
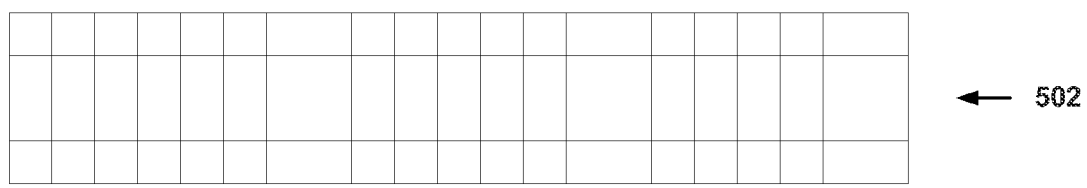
Figure 5E:
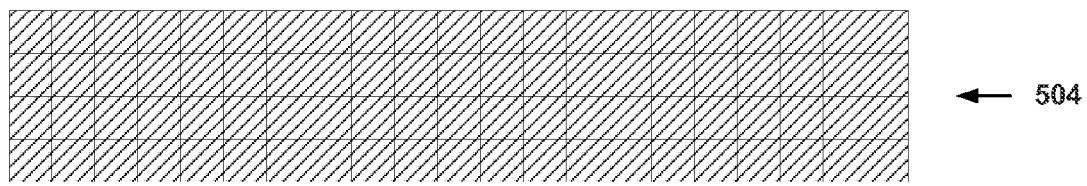
Figure 5F:
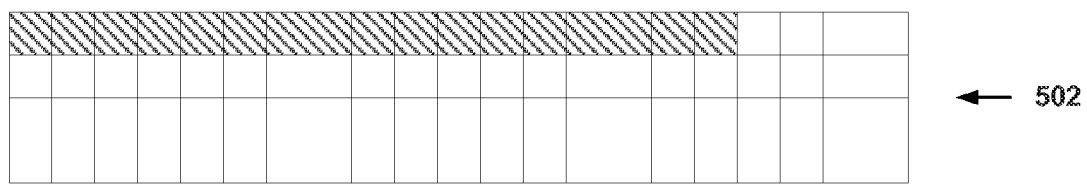
Figure 5F:
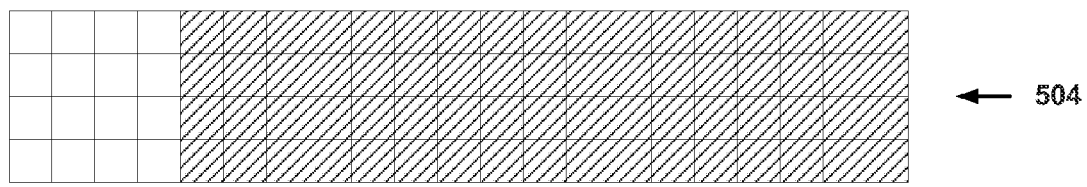
Figure 6:
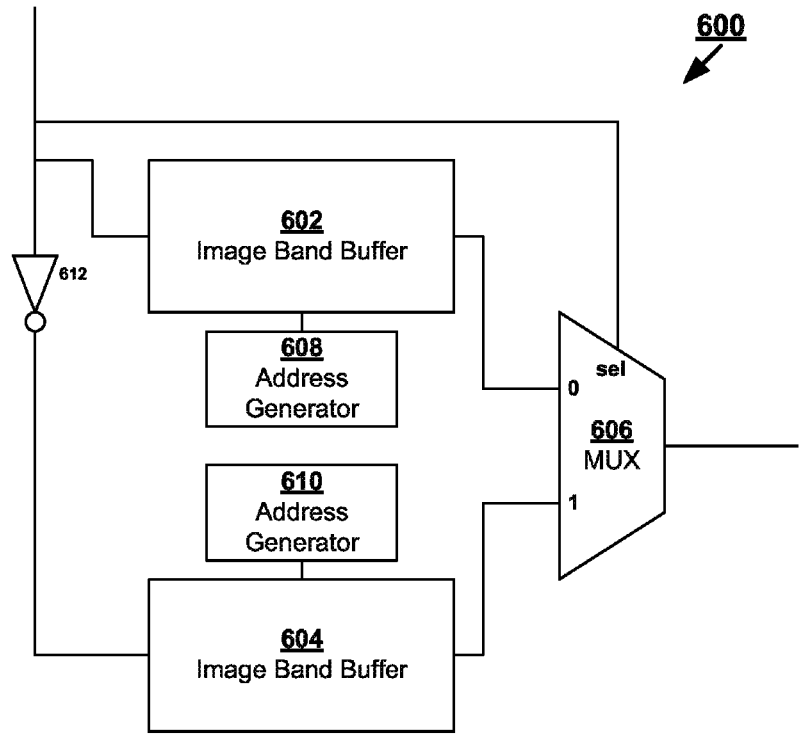
FIG. 6 shows a typical implementation of a ping-ponging raster to block converter.
Figure 7:
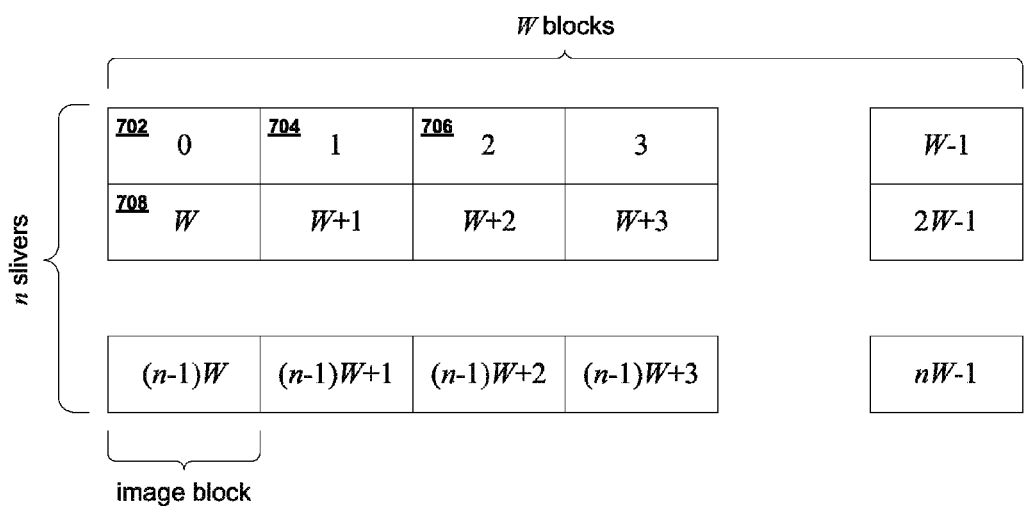
FIG. 7 shows a representation of an image band buffer.

FIG. 7 shows a representation of an image band buffer. Although in practice the buffer is a continuous memory, it is shown here as two dimensions. Each memory location is large enough to hold an image sliver. Initially as a raster scan is stored in memory, memory location 702 holds image sliver 0, memory location 704 holds image sliver 1, memory location 706 holds image sliver 2, memory location 708 holds image sliver W, and so forth. When the first block is read, image sliver 0 is read first, then image sliver W, followed by image sliver 2W, until image sliver (n−1)×W.

Figure 8:
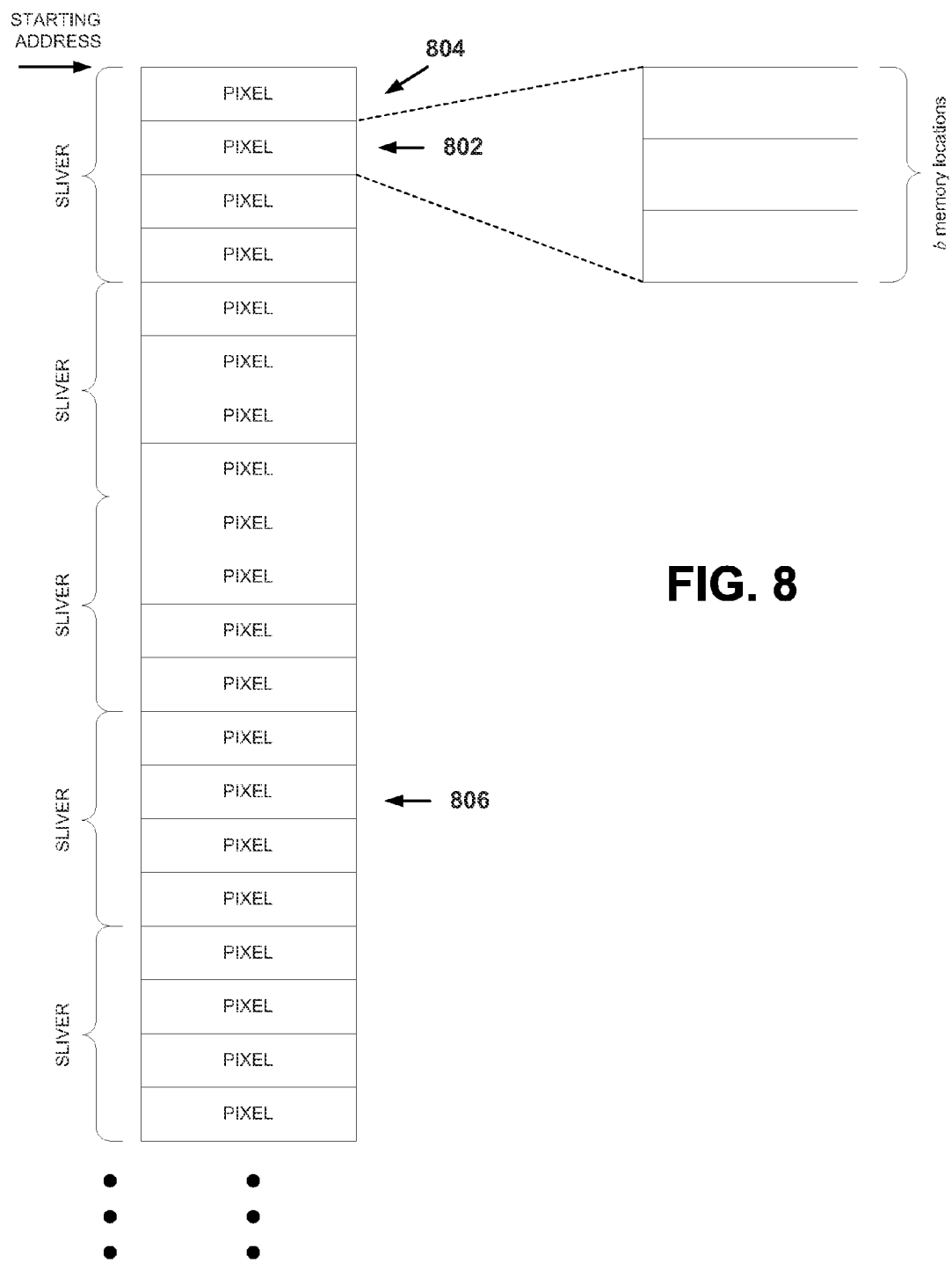

While the organization in FIG. 7 shows image band buffer memory organized in two dimensions, in actual implementation, the memory would appear contiguous. FIG. 8 is an example of what an image band buffer in memory would look like. Typically, the image band buffer would begin at a starting address, depending on the implementation this starting address may or may not be memory location 0. Each pixel as exemplified by pixel 802 comprises data stored in b memory locations. A memory location is any convenient unit of memory such as a byte, word, double word, etc. The number b is dependent on the color space used and the resolution. For example, 8-bit RGB could would occupy 3 bytes to store one pixel's data, but a 4:2:2 luminance-chrominance color space would occupy 1 byte to store one pixel's data.

For a given block size, the location or address of a pixel in memory can be thought of as having an image sliver part, a pixel part and an offset part. As described above the offset part is simply the start address of the image band buffer. The offset part is simply the start of the image band buffer in memory.

The image sliver part is the ordinal label of the image sliver to which the pixel belongs and the pixel part is the ordinal label of the pixel relative to the start of the image sliver. For an m×n block size, the image sliver part is the memory location relative to the start of the image band buffer divided by mb. As a result the pixel part can also be thought of as the remainder of this division. Referring back to FIG. 8, for the sake of example, suppose the start address is 2048 and b is 3 bytes. Data for pixel 804 is stored in the 3 bytes beginning at address 2048. Its image sliver part is 0 since it is in the zeroth image sliver. Its pixel part is 0 since it is the zeroth pixel within the zeroth image sliver. The offset part is 2048. Data for pixel 802 is stored in the 3 bytes beginning at address 2051. The image sliver part is also zero, but the pixel part is 1 because it is the first pixel within the zeroth image sliver. As a final example, data for pixel 806 is stored in the 3 bytes beginning at address 2087. It is the first pixel in the third image sliver, so the image sliver part is 3 and the pixel part is 1. Once again the offset part is 2048. For a given pixel location, the address is $a_i mb + a_p b + a_o$, where $a_i$ is the image sliver part, $a_p$ is the pixel part and $a_o$ is the offset part.

It should be understood that memory locations described here are assumed to be contiguous. While the physical implementation of a memory may not be contiguous, one of ordinary skill in the art would recognize that there is a logical addressing scheme of the image band buffer memory so that the memory is logically contiguous.

For clarity, a concrete values are used in the next example. FIG. 9A shows an image band buffer for and image that is 5 blocks wide with 4×4 blocks. When the first image band is read in, the buffer fills in as numbered. When the first block is read, image sliver 0 is read and a new image sliver 0 is received and written in its place, then image sliver 5 is read and new image sliver 1 is received and written in its place, then image sliver 10 is read and new image sliver 2 is written in its place, and then image sliver 15 is read and new image sliver 3 is written in its place. After the image band buffer is read and a second image band is written, the arrangement of the image slivers is as number in FIG. 9B. Then the second image band is read from the image band buffer and a third image band is written to the image band buffer. Again image sliver 0 is read and a new image sliver 0 is received as part of a third image band and written in place of the read image sliver. Then, image sliver 5 is read and new image sliver 1 is received and written in its place, but it should be noted that image sliver 5 is located in the second row and second column. The process continues for the remainder of the first block and proceeds for the next 4 blocks until the second image band is read and the third image band is written. The image slivers are now arranged as shown in FIG. 9C.

Figure 10:
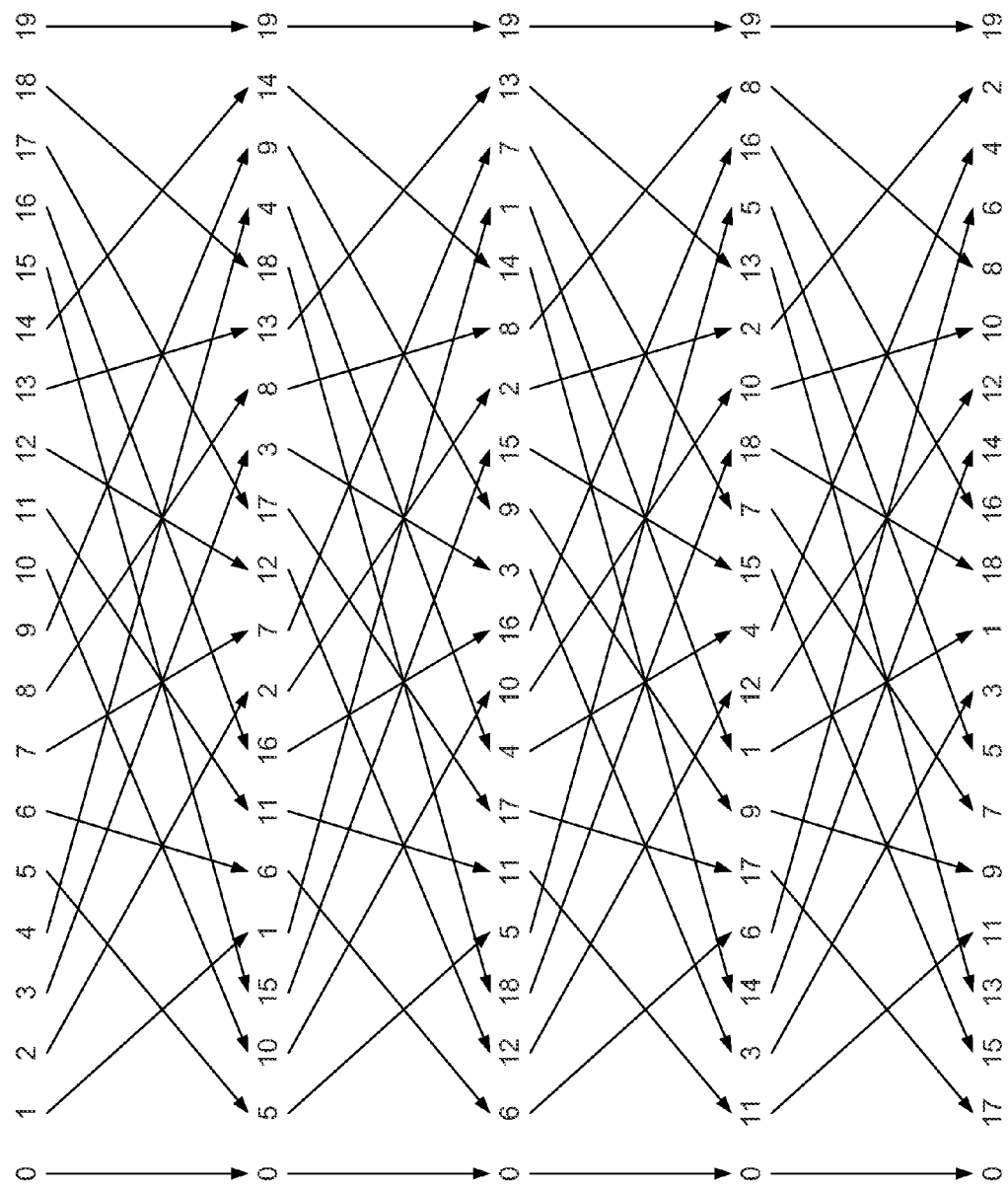
FIG. 10 further illustrates the permutation effect between reading of the first, second, third, fourth and fifth image bands.

The difficulty in using this approach of writing image slivers vacated by image slivers that are read is tracking the location of where the image slivers are stored. Clearly, some sort of permutation takes place on the image slivers. FIG. 10 further illustrates the permutation effect between reading of the first, second, third, fourth and fifth image bands. The permutation observed is a variant of a perfect shuffle, an inverse shuffle. In the example of FIG. 10, the image slivers can be thought of as being dealt into four piles and assembled.

Mathematically, a perfect shuffle can be difficult to represent in general due to issues with common divisors and the number of piles being shuffled. However, in this example, in the raster to block conversion (and vice versa), the number of "piles" is the image width in blocks, W, and the number of "cards" is n×W. For the example in FIG. 10, image sliver i in the second image band is located in location 5i modulo 19 except that image sliver 19 is still located in image sliver 19.

In the third image band buffered, image sliver i is located in location 6i modulo 19 except image sliver 19 is still located in image sliver 19. As it turns out 25≡6 modulo 19. In the fourth image band buffered, image sliver i is located in location 11i modulo 19 except image sliver 19 is still located in image sliver 19. As it turns out $5^3$=125≡11 modulo 19. It is not surprising then that in the fifth image band buffered, image sliver i is located in location $5^4 i$=625i≡17i modulo 19 except image sliver 19 is still located in image sliver 19.

In general to track down the location of a given image sliver after the kth image band is read, the following formula can be used. Image sliver i is located at location addr(i) given by $$addr(i) = \begin{cases} W^{k-1} i \, modulo \, (nW-1) & \text{if } i \neq nW-1 \\ nW-1 & \text{otherwise.} \end{cases} \quad (1)$$

Therefore to retrieve an image sliver, one only needs $$\delta = W^{k-1} \, modulo \, (nW-1) \quad (2)$$

to retrieve any image sliver in the $k^{th}$ image. Then the above equation becomes $$addr(i) = \begin{cases} \delta i \, modulo \, (nW-1) & \text{if } i \neq nW-1 \\ nW-1 & \text{otherwise} \end{cases} \quad (3)$$

It should also be noted because w and (nW−1) will always be relatively prime, so applying Euler-Fermat theorem we arrive at $$W^{\phi(nW-1)} \equiv 1 \, modulo \, (nW-1), \quad (4)$$

where $\phi$ is the Euler totient function. This property yields two useful facts. First, eventually δ=1 after $\phi(nW-1)$ image bands have been buffered. Secondly, $W^{-1}$ exists modulo (nW−1) specifically $$W^{-1} \equiv n^{\phi(nw-1)-1} \, modulo \, (nW-1), \quad (5)$$

a fact which should not be taken for granted. For example, the number 3 has not multiplicative inverse modulo 9. The fact that a multiplicative inverse exists implies that $W^{-1}$ can be used in a block to raster converter. There are many algorithms such as expanded Euclidean algorithm or direct exponentiation using equation (5) to calculate $W^{-1}$. However, it should be noted that nW≡1 modulo (nW−1) therefore $$W^{-1} \equiv n \, modulo \, (nW-1). \quad (6)$$

Figure 11:
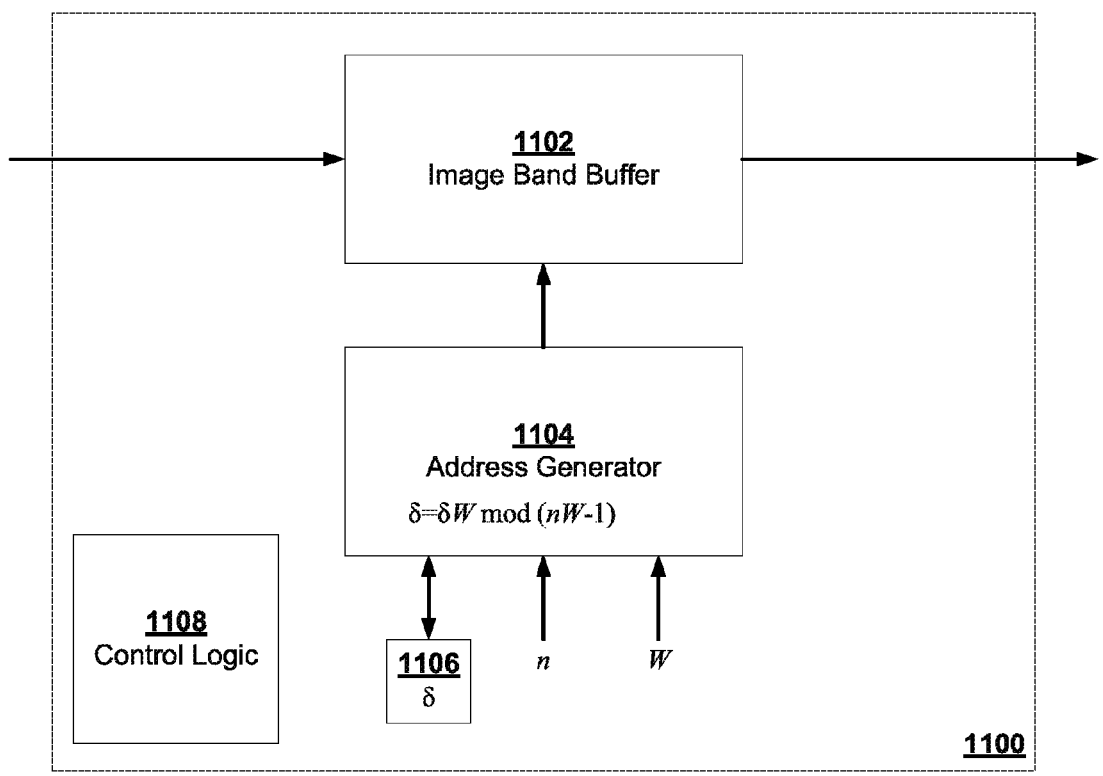
FIG. 11 illustrates a raster to block converter using a single image band buffer.

FIG. 11 illustrates a raster to block converter using a single image band buffer. The raster to block converter comprises control logic 1108 which retrieves pixel data from image band buffer 1102 from a memory location dictated by address generator 1104 and supplied to the output. Control logic 1108 receives pixel data from an incoming stream of pixel data and stores into the memory vacated by the pixel just read. Control logic 1108 can be dedicated logic circuits or a processor and is omitted from several subsequent figures for clarity. Address generator 1104 determines which memory location based on the index of the pixel within an image sliver and the index of the image sliver within the image band (e.g. $3^{rd}$ pixel of the $5^{th}$ image sliver). Based on the mathematics described above, the image sliver part of the memory location changes, but the pixel part and the offset part do not. To determine the address of the $i^{th}$ image sliver, equation (3) is used. The value of δ is initially set to 1, shown stored in memory 1106. After a complete image band is received, δ is then changed according to $$\delta = \delta W \, modulo \, (nW-1). \quad (7)$$

It should be noted that nW is also the width of the image and image band.

Figure 12:
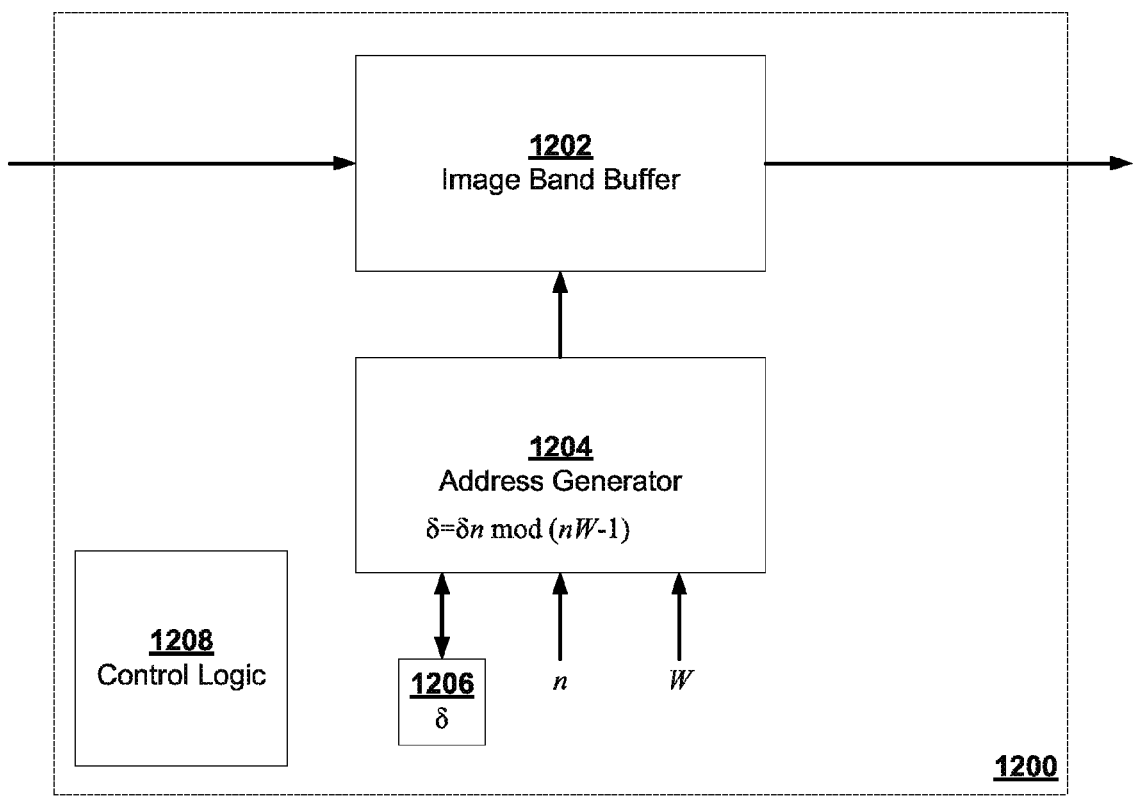
FIG. 12 illustrates a block to raster converter using a single image band buffer.

The elegance of this design is that the same architecture and nearly the same algorithm can be used as a block to raster converter. FIG. 12 illustrates a block to raster converter using a single image band buffer. Block to raster converter 1200 comprises an image band buffer 1202, address generator 1204, control logic 1208 and memory 1206 for storing the value of δ. The components block to raster converter 1200 function similarly to their counterpart in block converter 1100 except rather than changing δ between image bands by multiplying by W. After each image band is processed, δ is changed according to $$\delta = \delta W^{-1} \equiv \delta n \, modulo \, (nW-1). \quad (8)$$

This system has advantages over previous designs in the simplicity. A simple arithmetic expression is used to calculate the address of a given image sliver and a simple arithmetic expression is used to calculate δ between image bands. In principle the process can continue indefinitely. In some embodiments it may be desirable to reset the buffer and the value of δ between images. As long as the subsequent images are of the same size, this is not necessary. In addition, this system is flexible with block sizes and images sizes provided sufficient memory exists to hold a single image band.

Figure 13:
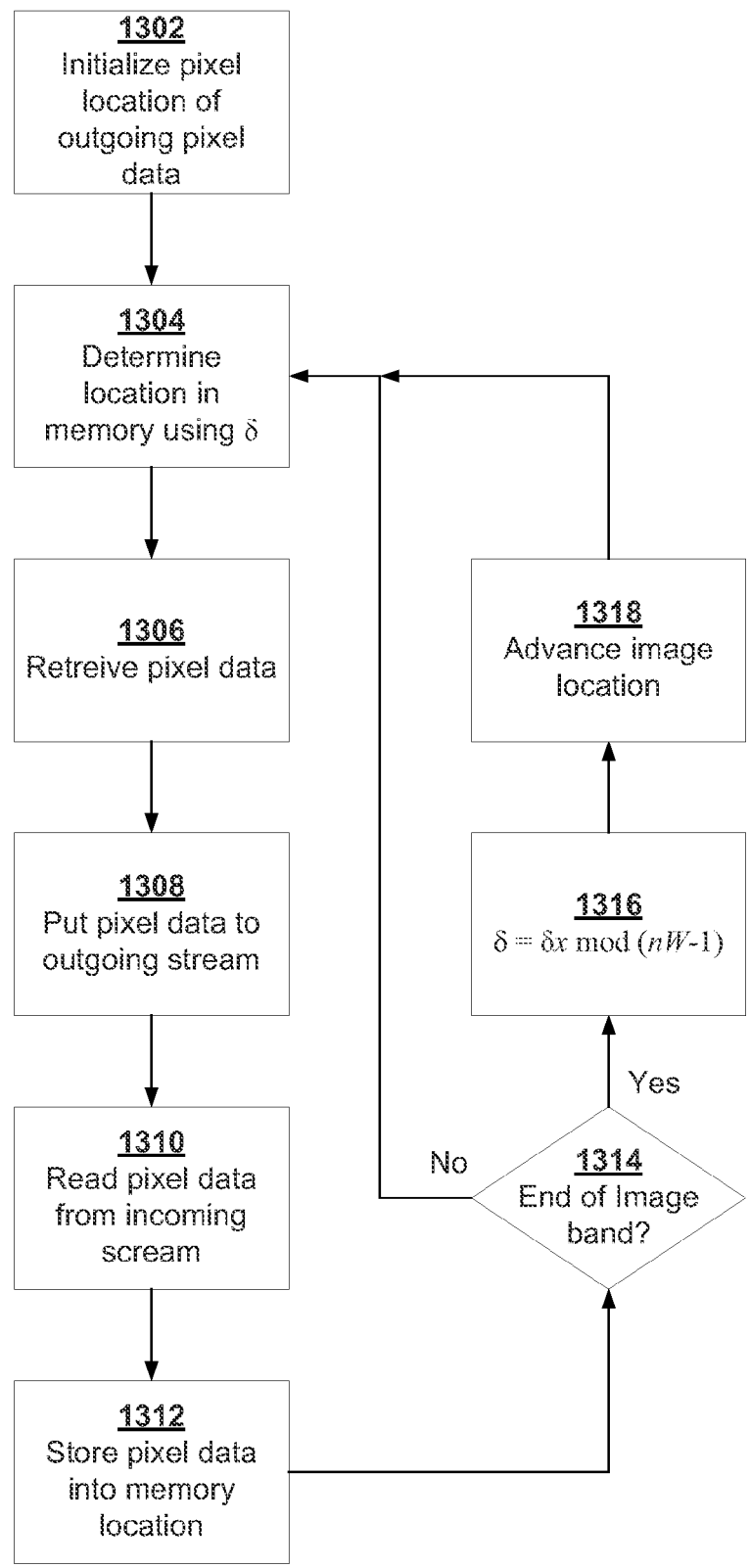
FIG. 13 illustrates a flowchart of the operation of a reordering converter capable of a raster to block or block to raster conversion.

FIG. 13 illustrates a flowchart of the operation of a reordering converter capable of a raster to block or block to raster conversion. At step 1302, the current location of the current pixel data in the outgoing pixel data stream is initialized. Typically, since convention scans from left to right and top to bottom, the current pixel location is set to zero. At step 1304, the corresponding memory location of the current pixel is determined. The memory location is determined by using the address conversion given by equation (3). It should be emphasized again that the mapping involves only the image sliver part of a memory location. At step 1306, the pixel data is retrieved from the memory location and placed in the outgoing pixel data stream at step 1308. The next pixel in the incoming pixel data stream is received at step 1310 and stored into the memory location just vacated at step 1312. At step 1314, a determination is made as to whether the current image band has now been read completely. If it has then at step 1316, δ is multiplied module (nW−1) or equivalently (w−1), where w is the image width, by a factor x, where x=n if the reordering is raster to block conversion and x=W if the reordering is a block to raster conversion. At step 1318, the location is advanced to the next pixel data in the outgoing pixel data stream.

While the method described above in FIG. 1302 depicts the operation of the reordering converter as moving one pixel from memory to the outgoing pixel data stream and storing one pixel from the incoming pixel data stream to memory as occurring one pixel at a time. At step 1306, a collection of pixels could be read from memory and placed into the outgoing pixel data stream at step 1308. The same number of pixels could be retrieved from incoming pixel data stream at step 1310 and stored into the vacated memory locations at step 1312. As an example, since each image sliver is moved as a block, practical implementations may operation one image sliver at a time rather than one pixel at a time.

Figure 14:
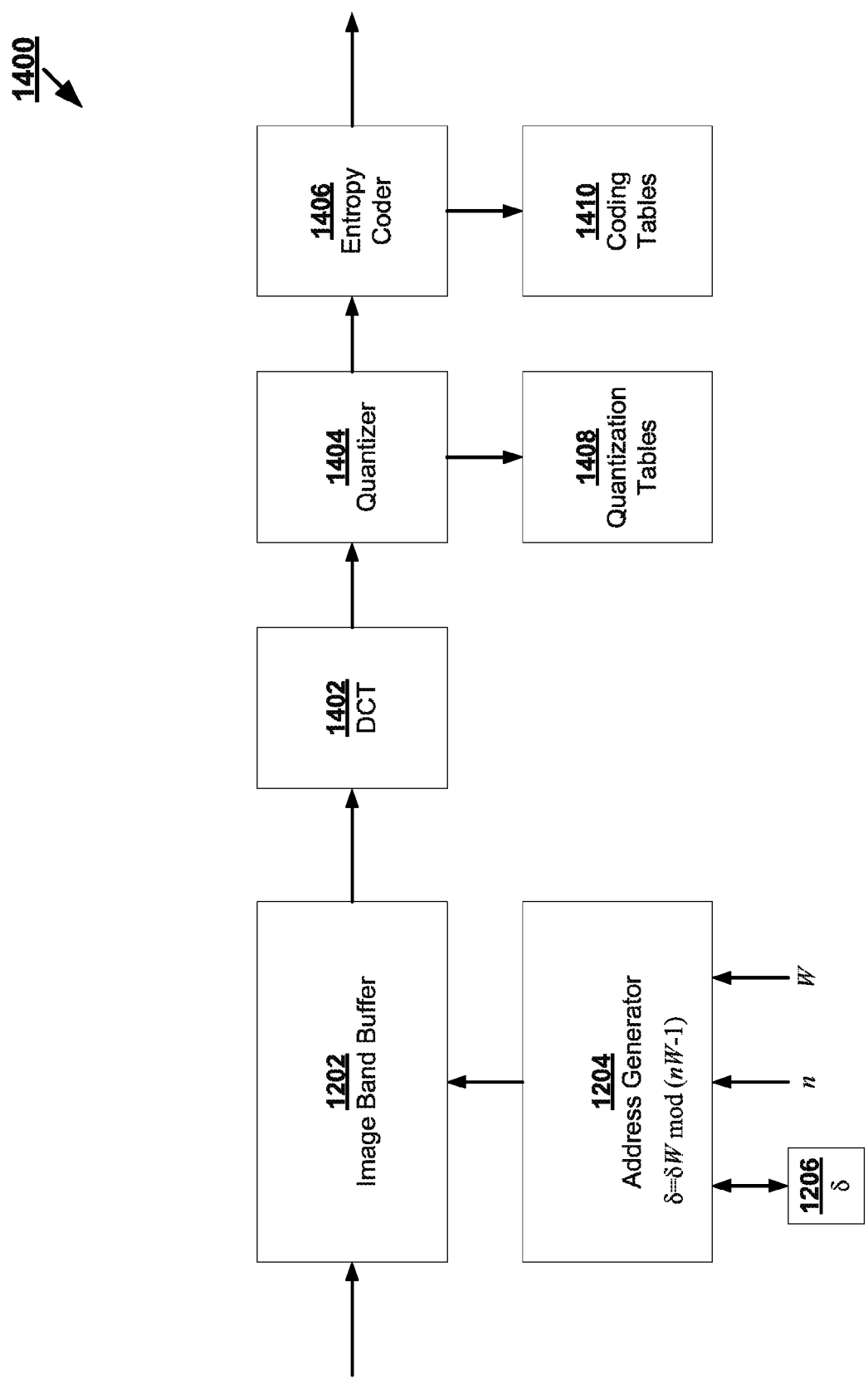
FIG. 14 illustrates the raster to block converter incorporated into a discrete cosine transform (DCT) encoder such as a JPEG encoder.

FIG. 14 illustrates the raster to block converter incorporated into a discrete cosine transform (DCT) encoder such as a JPEG encoder. Encoder 1400 comprises image band buffer 1102 and address generator 1104 much as described above for raster to block converter 1100. The data in block form is then transform by DCT 1402 which operates on blocks. The transformed data is then quantized by quantizer 1404, some quantization table parameters may be generated and stored in quantization table 1408 which gets appended to the output file. The quantized data is then entropy coded by entropy coder 1406. Resultant coding table 1410 is also appended to the output file along with the entropy coded data. Entropy coding is essentially data compression and can be any number of standard entropy codes such as Huffman and Lempel-Ziv-Weber. It should be noted that operations by DCT 1402, quantizer 1404 and entropy coder 1406 generally operate on blocks. Essentially when DCT 1402 transforms a block the block can be sent to the quantizer 1404 so that DCT 1402 is free to process the next block and so forth.

Figure 15:
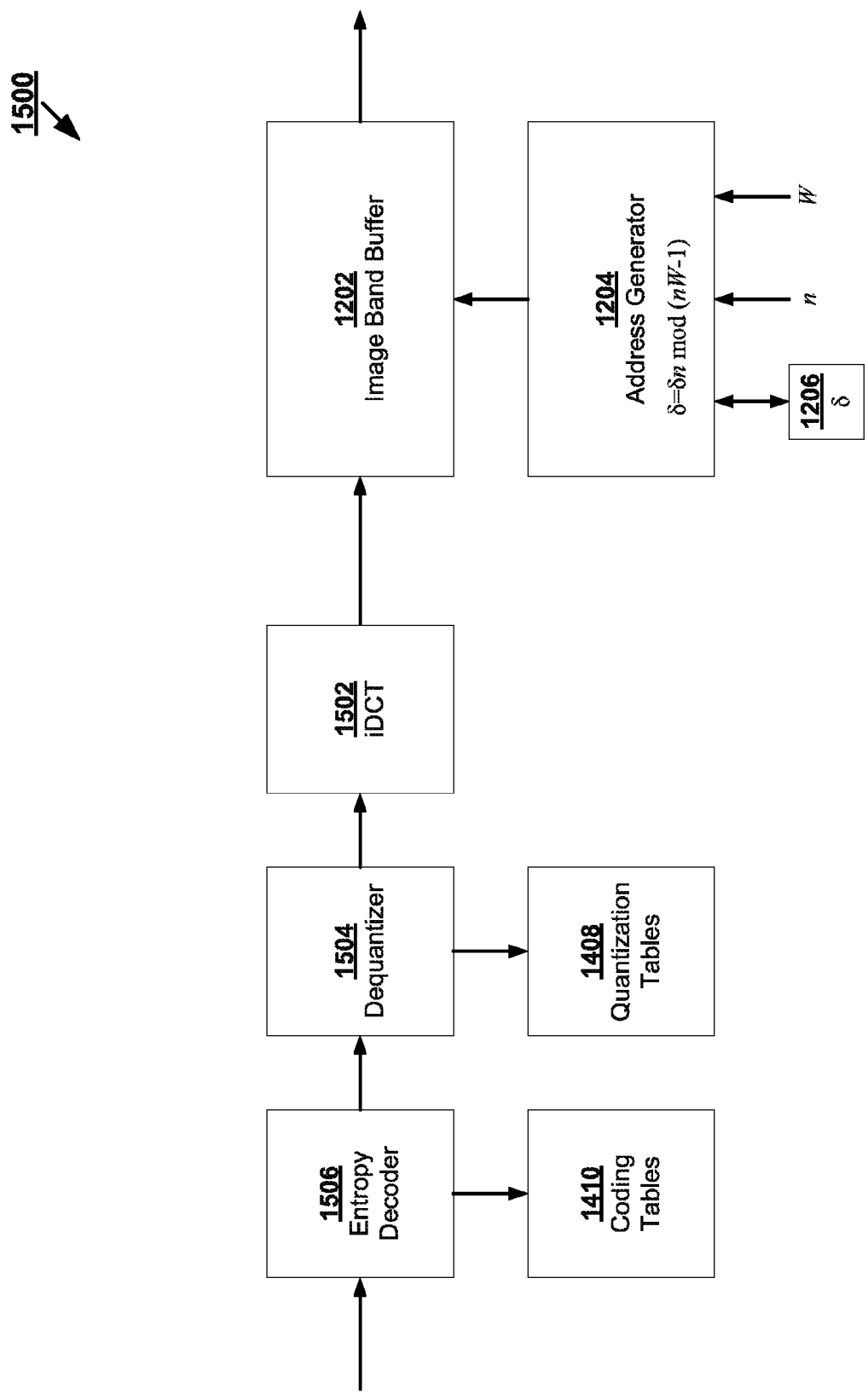

FIG. 15 illustrates the block to raster converter incorporated into a DCT decoder such as a JPEG decoder. Decoder 1500 comprises entropy decoder 1506 and dequantizer 1504 which may used information from coding tables 1410 and quantization tables 1408 which can be imbedded into the incoming compressed image file. The decoded and dequantized data which has been processed in block form is then inverse DCT (iDCT) transformed by iDCT 1502. Again all operations performed by entropy decoder 1506, dequantizer 1502 and iDCT 1502 generally are performed on a block by block basis. The resultant blocks are then converted to raster form by image band buffer 1202 and address generator 1204 much as described for block to raster converter 1200.

Figure 16A:
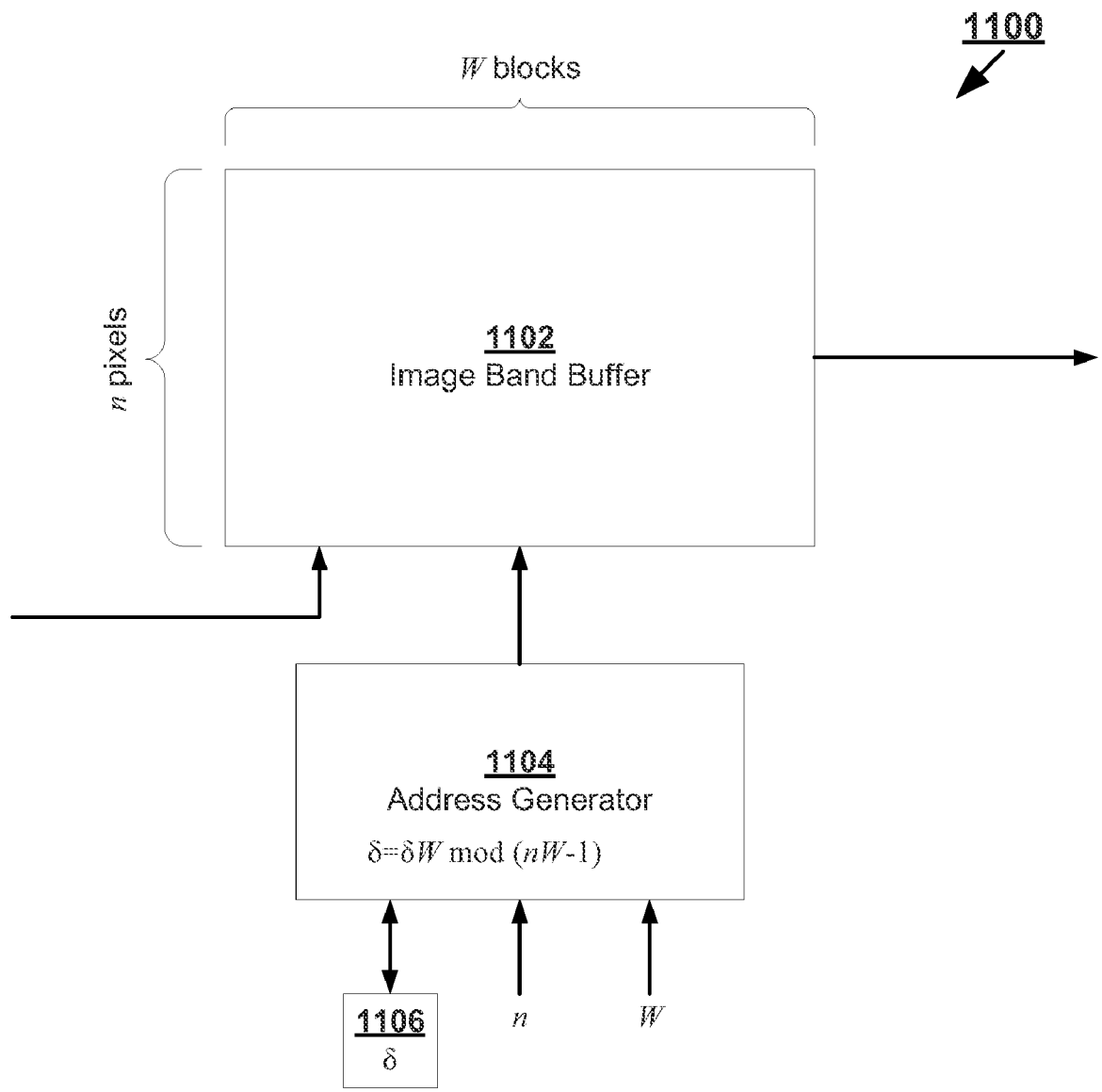
FIG. 16A shows the raster to block generator of FIG. 10 redrawn to indicate the dimensions of the image band buffer.

FIG. 16A shows the raster to block generator of FIG. 11 redrawn to indicate the dimensions of image band buffer 1102. Image band buffer 1102 has sufficient memory to hold an image band of n×mW pixels or W blocks of size n×m. However, the same image band buffer can also be used to accommodate blocks of different sizes. For example, if smaller blocks of size ½n×½m are used alteration of the address generator can reconfigure the raster to block generator to accommodate the smaller block size.

Figure 16B:
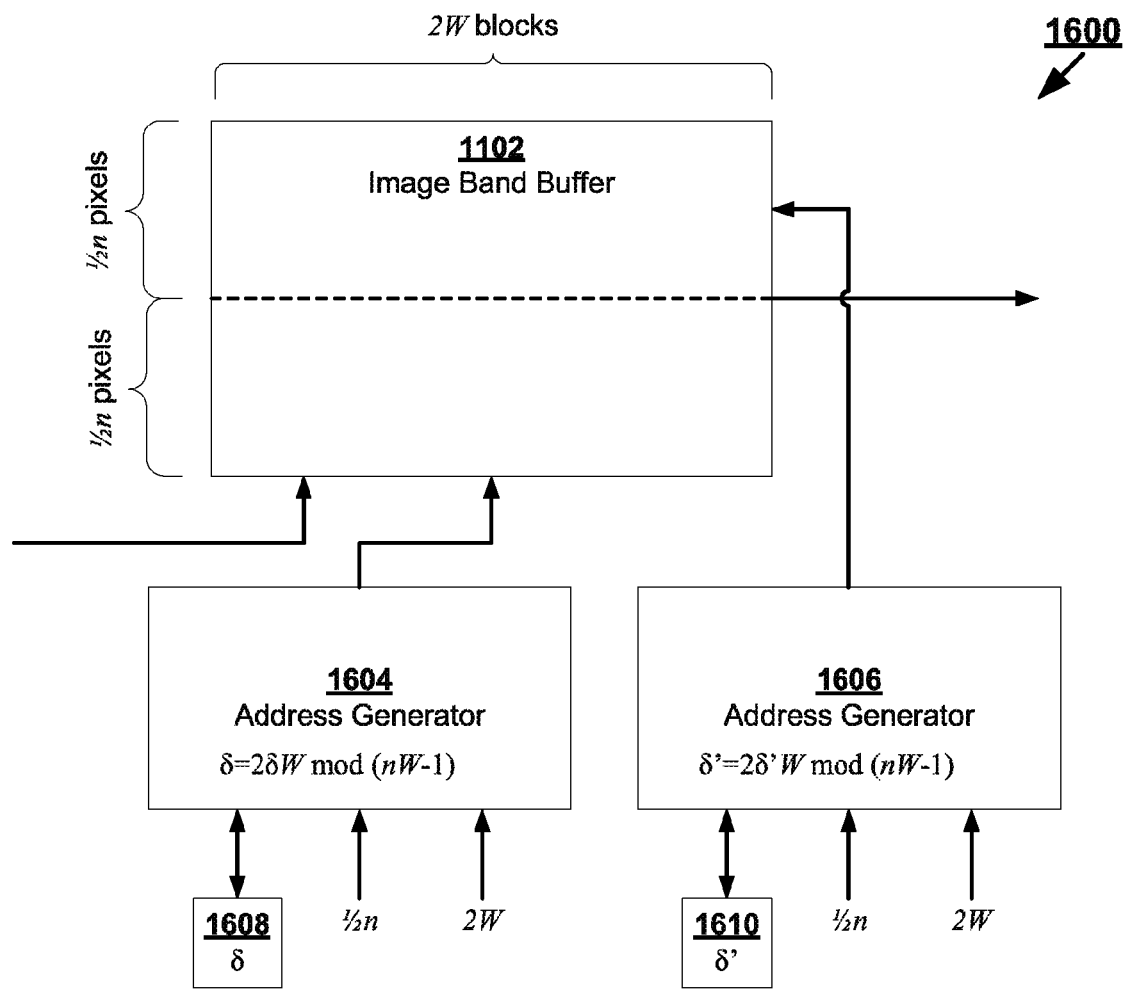
FIG. 16B shows the image band buffer configured to accommodate block sizes of size ½n×½m.

FIG. 16B shows raster to block converter 1600 where the image band buffer 1102 configured to accommodate block sizes of size ½n×½m. With the smaller block size, image band buffer 1102 can now hold two bands of ½n×mW, each capable of accommodating 2W blocks of size ½n×½m. Shown as separate address generator 1604 controls the addressing of the one of these bands and address generator 1606 controls the addressing of the second one of these bands, shown as separate by the dotted line in image band buffer 1102. Both δ and δ' are depicted as stored in memory 1608 and 1610. In principle of both bands are operated in lock step, only one address generator and one value of δ can needed. Because the number of blocks spanning the image width is now doubled with the smaller block size, equation 7 now replaces W by 2W, so each time the image band buffer is emptied, δ is update by multiplying by 2W modulo nW−1. Because there is no need for the two image bands to be processed synchronously, the two address generators can operate independently. In principle, there would still be one address generator that controls both parts of the image band buffer accommodating each of the two smaller image bands. Clearly, this approach can be expanded arbitrarily to any smaller size block.

Figure 16C:
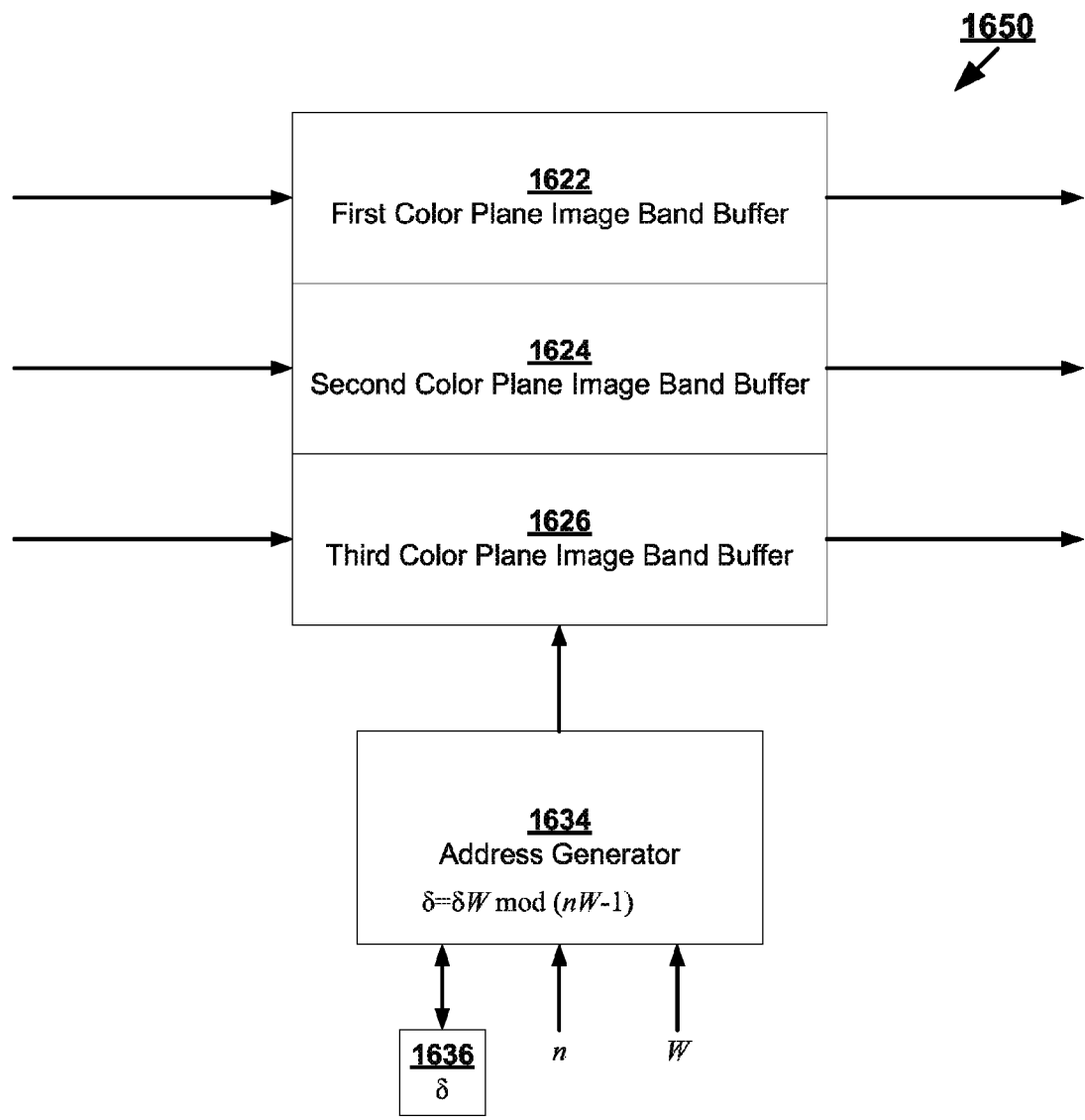
FIG. 16C shows an image band buffer broken up into image band buffers for its constituent color planes.

In another implementation, for color images, it may be more advantageous to perform the reordering conversion on the various color planes separately. FIG. 16C shows a raster to block converter 1650 where an image band buffer broken up into image band buffers for its constituent color planes. As depicted in FIG. 16C, an example of a three color space model such as RGB or $YC_rC_b$. It comprise first color plane image band buffer 1622, second color plane image band buffer 1624, and third color plane image band buffer 1626. This can be viewed as three parallel reordering converters. Because each color component of a given pixel is transformed as a unit, in practice, each component of a pixel is written and read from each color plane image band buffer essentially at the same time. As a result, a single address converter (1634) using a signal δ value (shown as stored in memory 1636) can be used to transform the image sliver part of all three components simultaneously. It should be noted that the representation in each color plane need not be at the same resolution. In the case of $YC_rC_b$, the luminance component is often represented by more bits than each chrominance component.

While a given image band buffer could be sliced up to accommodate smaller block sizes in the reverse reasoning, a larger image band buffer would enable the processing of many image bands simultaneously, leading up to storing the entire image. Particularly in the case of processing motion images, it may be desirable to store the entire frame.

Figure 17:
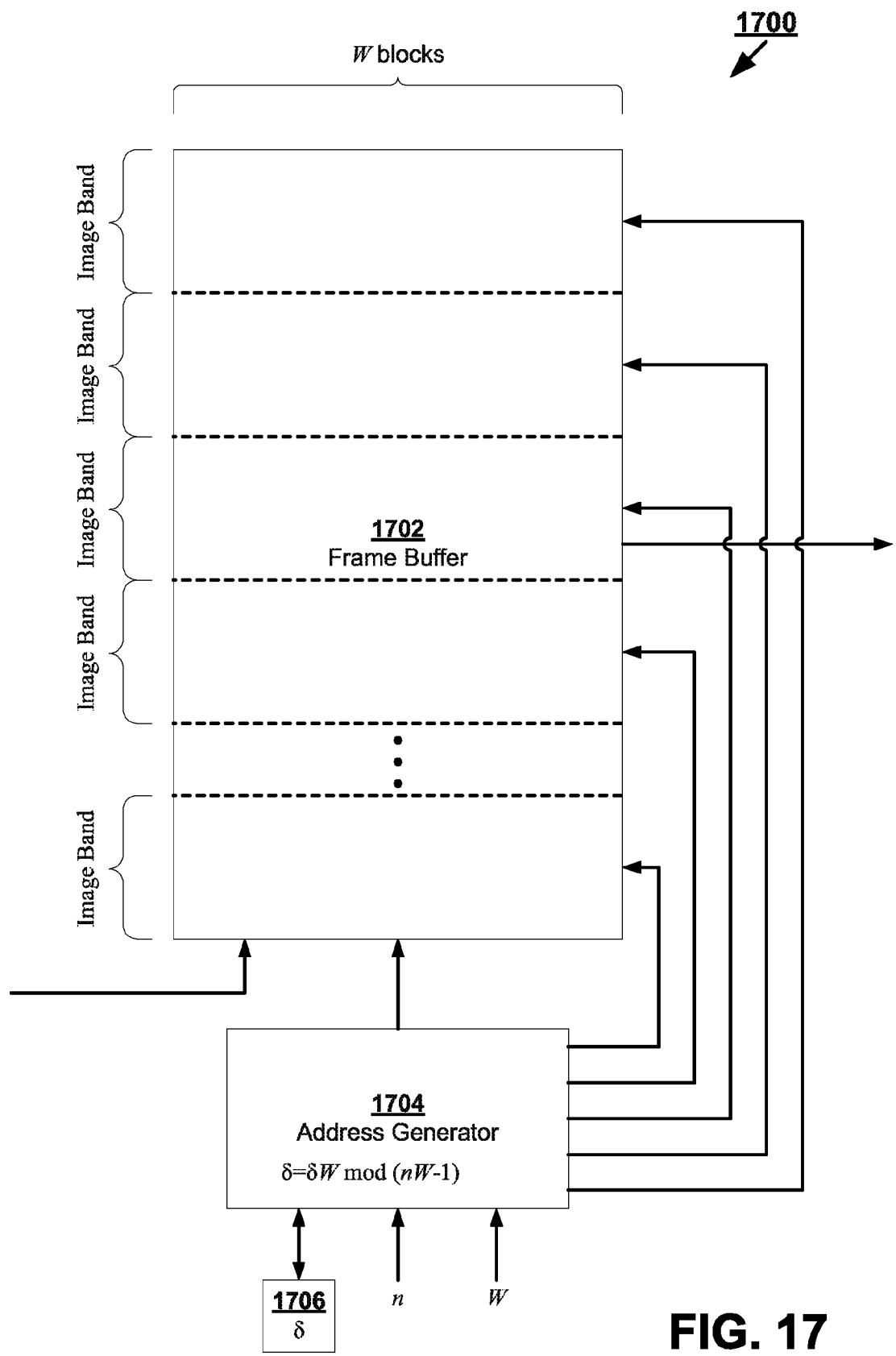
FIG. 17 shows a raster to block converter that uses a frame buffer.

FIG. 17 shows a raster to block converter that uses a frame buffer. The image band buffer of previous embodiments is now replaced by frame buffer 1702 which is large enough to contain an entire image. In this case address generator 1704 can control the address mapping for each of the image bands within the frame, and memory 1706 is shown as storing δ. Generally, for simplicity the addressing will be synchronized between each the bands, but they do not have to be. For each individual band, raster to block converter 1700 operates much as described for raster to block converter 1100. Likewise, a frame buffer can be used for the block to raster conversion.

Figure 18:
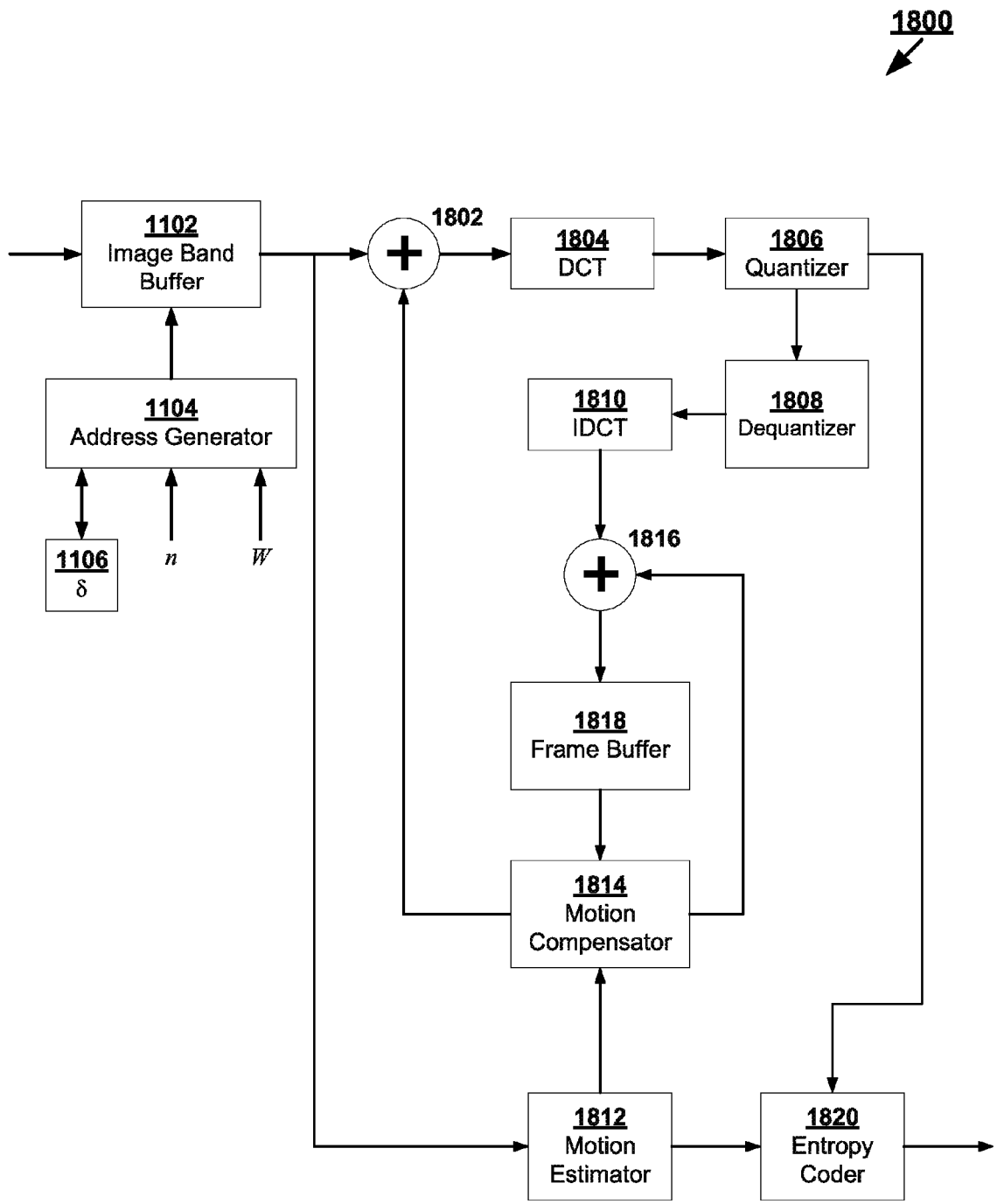
FIG. 18 shows a raster to block converter integrated into a typical motion image encoder such as MPEG.

FIG. 18 shows raster to block converter 1100 integrated into a typical motion image encoder such as MPEG. Alternatively, raster to block converter 1700 which uses a frame buffer could be used, so image band buffer 1102 is replaced by frame buffer 1702 and address generator 1104 is replaced by address generator 1704. Both the motion estimator 1812 and DCT 1804 operate on blocks. So raster information is supplied to image band buffer 1102 and read out in block form.

Generally, motion image encoders attempt to synthesize out the effects of motion and also exploit the fact that consecutive frames change very little. In this way motion vectors and differences between frames are all that need to be stored or transmitted. To this end, DCT 1804 and quantizer 1806 are used to encode the residual error after motion effects and differences between frames are removed. This is done by subtracting motion compensated images with adder 1802. The residual error is dequantized and decoded by dequantizer 1808 and iDCT 1810 and added to a motion compensated image by adder 1816. This in effect is a "decoded image" which can be compared to the original image to refine the residual error to be encoded. Frame buffer 1818 and motion compensator 1814 produce a motion compensated image. Motion compensator 1814 uses motion vectors generated by motion estimator 1812. The quantized error and motion vectors are then entropy coded by entropy coder 1820 where the resultant output can be stored or transmitted as compressed motion image data.

Figure 19:
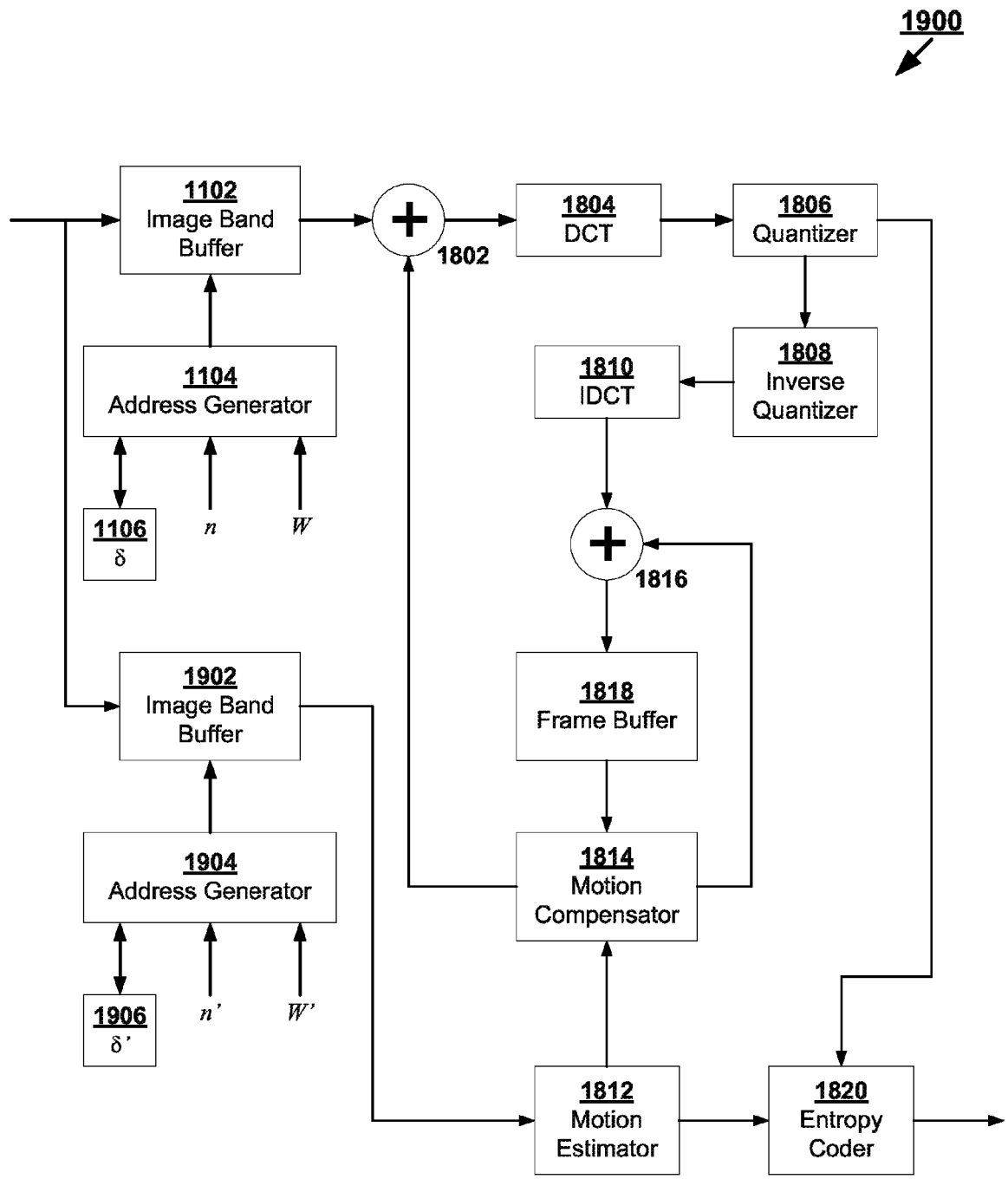
FIG. 19 shows a motion image encoder using a separate raster to block converter for the encoding path and the motion estimation path.

Although motion estimation and image encoded (e.g. DCT) operate on block data, they can use different block sizes. FIG. 19 shows motion image encoder 1900 using a separate raster to block converter for the encoding path and the motion estimation path. Again though shown as using image band buffers, frame buffers can also be used. The raster to block converter of encoder 1800 is now moved to the encoding path. A second raster to block converter comprising image band buffer 1902 and address generator 1904 is added to the motion estimation path. Because the block sizes between the two raster to block converters may be different, the parameters fed to address generator 1904 are indicated as n' and W'.

Figure 20:
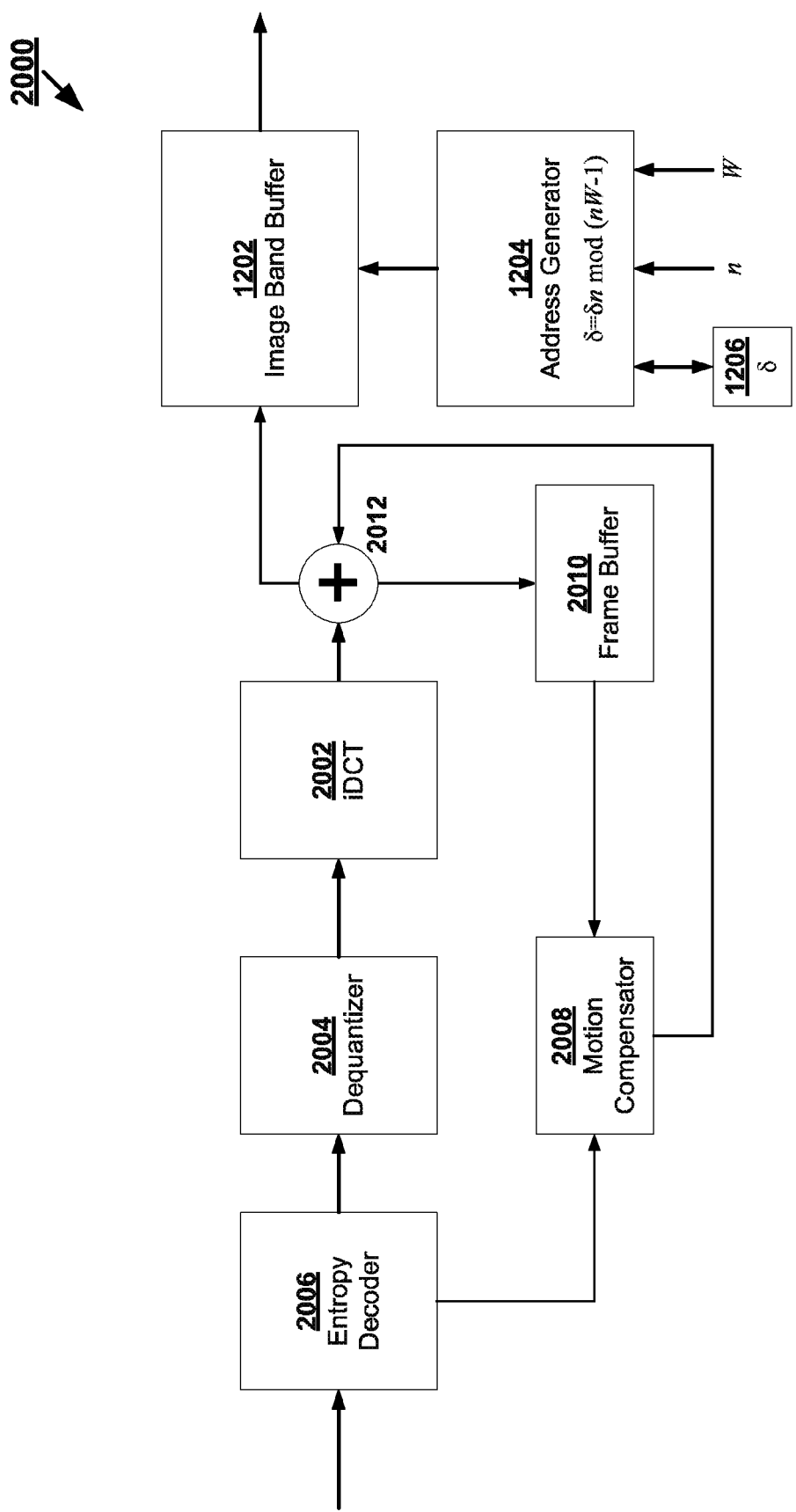

FIG. 20 shows corresponding motion image decoder 2000. The compress motion image data is decoded by entropy decoder 2006 and separated into the encoded error and motion vectors. The motion vectors are supplied to motion compensator 2008 along with frame buffer 2010 provide an estimate of a current frame. The encoded error is dequantized by dequantizer 2004 and transformed by iDCT 2002 to provide the error to the estimate of the current frame. Because for the given frame each operation can be performed on a block by block basis, a stream of blocks can be stored in image band buffer 1202 (which alternatively can be a frame buffer) and extracted in raster order to be displayed. Address generator 1204 controls the block to raster conversion and operates much as described for block to raster converter 1200.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A method of processing an image comprising:
    determining a memory location from an image band location associated with a first pixel having first pixel data;
    retrieving the first pixel data from a memory at the memory location;
    outputting the first pixel data to an outbound stream of pixel data;
    receiving second pixel data from an inbound stream;
    storing the second pixel data to the memory at the memory location,
    wherein the determining the memory location comprises:
        separating the image band location into an image sliver part i, a pixel part, and an offset part on the basis of a predetermined block size;
        mapping the image sliver part to a converted image sliver part addr(i) by the equation $$addr(i) = \begin{cases} \delta i \, \text{modulo}(w-1) & \text{if } i \neq w-1 \\ w-1 & \text{otherwise,} \end{cases}$$

where w is the width of the image and δ is a multiplicative factor; and
        combining the converted image sliver part, the pixel part and the offset part into the memory location; and
        multiplying δ by a predetermined factor modulo (w−1) after all pixels in an image band have been retrieved.

2. The method of claim 1, wherein the inbound stream is in raster order;
    the outbound stream is in block order;
    the predetermined block has a width; and
    the predetermined factor is w divided by the width.

3. A method of claim 2, further comprising:
    performing a discrete cosine transform on the outbound stream of pixel data to produce transformed image data;
    quantizing the image transformed image data; and
    entropy encoding the transformed image data.

4. The method of claim 1, wherein the inbound stream is in block order;
    the outbound stream is in raster order;
    the predetermined block has a height; and
    the predetermined factor is the height.

5. The method of claim 4, further comprising:
    entropy decoding encoded image data;
    dequantizing the encoded image data; and
    performing an inverse DCT on the encoded image data to produce the inbound stream of pixel data.

6. An image processing apparatus comprising:
    a reordering converter for reordering an image from an inbound stream of pixel data into an outbound stream of pixel data comprising:
        a memory;
        control logic which retrieves first pixel data from a memory location in the memory and places the first pixel data on the outbound stream of pixel data and receives second pixel data from the inbound stream and stores the second pixel data into the memory at the memory location;
    an address converter, which separates an image band location associated with the first pixel data into an image sliver part i, a pixel part, and an offset part on the basis of a predetermined block size; maps the image sliver part is converted by the equation $$addr(i) = \begin{cases} \delta i \, \text{modulo}(w-1) & \text{if } i \neq w-1 \\ w-1 & \text{otherwise} \end{cases}$$

into image sliver part addr(i), where w is the width of the image and δ is a multiplicative factor; combines the converted image sliver part, the pixel part and the offset part into the memory location; and multiplies δ by a predetermined factor after all pixels in an image band have been retrieved.

7. The image processing apparatus of claim 6, wherein the memory comprises a frame buffer.

8. The image processing apparatus of claim 6, wherein the inbound stream is in raster order;
    the outbound stream is in block order;
    the predetermined block has a width; and
    the predetermined factor is w divided by the width.

9. The image processing apparatus of claim 8, further comprising:
    a DCT module coupled to the reordering converter;
    a quantizer coupled to the DCT module; and
    an entropy coder coupled to the quantizer.

10. The image processing apparatus of claim 8, further comprising:
    a DCT module coupled to the reordering converter,
    a quantizer coupled to the DCT module,
    a dequantizer coupled to the quantizer,
    an IDCT module coupled to the dequantizer;
    a motion estimator; and
    a motion compensator coupled to the motion estimator.

11. The image processing apparatus of claim 8, further comprising:
    a second reordering converter coupled to the motion estimator.

12. The image processing apparatus of claim 6, wherein the inbound stream is in block order;
    the outbound stream is in raster order;
    the predetermined block has a height; and
    the predetermined factor is the height.

13. The image processing apparatus of claim 12, further comprising:
- a iDCT module coupled to the reorder converter;
- a dequantizer coupled to the DCT module; and
- an entropy decoder coupled to the dequantizer.

14. The image processing apparatus of claim 12, further comprising:
- a iDCT module coupled to the reorder converter;
- a dequantizer coupled to the DCT module;
- an entropy decoder coupled to the dequantizer; and
- a motion compensator coupled to the entropy decoder.

15. An image processing apparatus comprising:
- a memory;
- means for converting an image band location associated with a first pixel having first pixel data into a memory location, comprising:
  - means for separating the image band location into an image sliver part i, a pixel part, and an offset part on the basis of a predetermined block size;
  - means for mapping the image sliver part to a converted image sliver part addr(i) by the equation $$addr(i) = \begin{cases} \delta i\, \text{modulo}(w-1) & \text{if } i \neq w-1 \\ w-1 & \text{otherwise,} \end{cases}$$

where w is the width of the image and $\delta$ is a multiplicative factor;
  - means for combining the converted image sliver part, the pixel part and the offset part into the memory location; and
  - means for multiplying $\delta$ by a predetermined factor after all pixels in the first image band have been retrieved;
- means for retrieving the first pixel data from the memory at the memory location;
- means for outputting the first pixel data to an outbound stream of pixel data;
- means for receiving second pixel data from an inbound stream;
- means for storing the second pixel data to the memory at the memory location.

16. The image processing apparatus of claim 15, wherein the inbound stream is in raster order;
- the outbound stream is in block order;
- the predetermined block has a width; and
- the predetermined factor is w divided by the width.

17. The image processing apparatus of claim 16, further comprising:
- means for performing a discrete cosine transform on the image to produce transformed image data;
- means for quantizing the image transformed image data; and
- means for entropy encoding the transformed image data.

18. The image processing apparatus of claim 15, wherein the inbound stream is in block order;
- the outbound stream is in raster order;
- the predetermined block has a height; and
- the predetermined factor is the height.

19. The image processing apparatus of claim 18, further comprising:
- means for entropy decoding the encoded image data;
- means for dequantizing the encoded image data; and
- performing an inverse DCT on the encoded image data to produce an image.

20. The image processing apparatus of claim 18, further comprising means for entropy decoding the encoded image data.

* * * * *

UNITED STATES PATENT AND TRADEMARK OFFICE
CERTIFICATE OF CORRECTION

| | | |
|---|---|---|
| PATENT NO. | : 8,355,570 B2 | |
| APPLICATION NO. | : 12/540330 | |
| DATED | : January 15, 2013 | |
| INVENTOR(S) | : Manhar Karsanbhai et al. | |

It is certified that error appears in the above-identified patent and that said Letters Patent is hereby corrected as shown below:

In the Claims:

Column 12, line 26, delete "is"

Signed and Sealed this
Twenty-fifth Day of June, 2013

Teresa Stanek Rea
*Acting Director of the United States Patent and Trademark Office*